United States Patent
Ito

(10) Patent No.: US 7,105,212 B2
(45) Date of Patent: *Sep. 12, 2006

(54) OPTICAL COMPENSATORY SHEET COMPRISING POLYMER FILM

(75) Inventor: Yoji Ito, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 103 days.

This patent is subject to a terminal disclaimer.

(21) Appl. No.: 10/508,864

(22) PCT Filed: Apr. 18, 2003

(86) PCT No.: PCT/JP03/04998

§ 371 (c)(1),
(2), (4) Date: Sep. 24, 2004

(87) PCT Pub. No.: WO03/089965

PCT Pub. Date: Oct. 30, 2003

(65) Prior Publication Data

US 2005/0123693 A1   Jun. 9, 2005

(30) Foreign Application Priority Data

Apr. 19, 2002  (JP) .......................... 2002-118199
Feb. 4, 2003   (JP) .......................... 2003-027488

(51) Int. Cl.
    G02B 5/30    (2006.01)
(52) U.S. Cl. .................. 428/1.3; 428/1.33; 349/118; 252/299.01
(58) Field of Classification Search ............ 428/1.1, 428/1.3, 1.33; 349/117–119, 12, 162; 345/104, 345/173; 252/299.01
    See application file for complete search history.

(56) References Cited

U.S. PATENT DOCUMENTS

| | | | | |
|---|---|---|---|---|
| 5,412,044 A | * | 5/1995 | Hefner et al. ............... | 525/523 |
| 5,464,912 A | * | 11/1995 | Hefner et al. ............... | 525/523 |
| 5,852,487 A | * | 12/1998 | Fujimori et al. ............ | 349/162 |
| 6,020,945 A | * | 2/2000 | Sawai et al. ................ | 349/119 |
| 6,362,862 B1 | * | 3/2002 | Itoh et al. .................... | 349/119 |
| 6,844,033 B1 | * | 1/2005 | Shimizu et al. ............ | 428/1.33 |

FOREIGN PATENT DOCUMENTS

| | | |
|---|---|---|
| DE | 19941567 A1 | 4/2000 |
| EP | 982621 A2 | 3/2000 |
| JP | 11-80090 A | 3/1999 |
| JP | 2000-056301 A | 2/2000 |
| JP | 2000-111914 A | 4/2000 |
| JP | 2000-112663 | 4/2000 |
| JP | 2000-137116 A | 5/2000 |
| JP | 2000-304932 A | 11/2000 |
| JP | 2001-98086 A | 4/2001 |
| JP | 2001-154018 A | 6/2001 |
| JP | 2001-154194 A | 6/2001 |
| JP | EP 1 182 470 A1 * | 2/2002 |
| JP | 2002-71954 A | 3/2002 |
| JP | 2002-98835 A | 4/2002 |
| JP | 2002-99388 A | 4/2002 |
| JP | 2002-363343 A | 12/2002 |
| WO | WO 00/65384 A1 | 11/2000 |

OTHER PUBLICATIONS

Abstract, JP 2000-056301, Fujii Sadao, Feb. 2000.*
Abstract, JP 2000-112663, Fujii Sadao, Apr. 2000.*
Abstract, JP 2000-111914, Murayama Masahiko, Apr. 2000.*
Abstract, JP 2002-099388, Fujii Takamitsu, Apr. 2002.*
Abstract, JP 2001-098086, Sata Hiroaki, Apr. 2001.*
Abstract, JP 2001-137116, Uchiyama Akihiko, May 2000.*
Abstract, JP 2001-154018, Kuzuhara Noriyasu, Jun. 2001.*
Abstract, JP 2001-154194, Kuzuhara Noriyasu, Jun. 2001.*
Abstract, JP 2000-304932, Ito Yoji, Nov. 2000.*
Abstract, JP 11-080090, Hasebe Hiroshi, Mar. 1999.*
Abstract, WO 00/65384, Hiroyuki Mori, Nov. 2000.*
EP 0982621, Yasushi Sato, Mar. 2000.*
Abstract, DE 199441567 A1, Binder et al, Apr. 2000.*
English language translation of the International Preliminary Examination Report mailed Dec. 17, 2003, in International Application No. PCT/JP02/02411.*
Abstract, JP 2000-137116, Uchiyama Akihiko, May 2000.*
English language translation of the International Preliminary Examination Report mailed Dec. 17, 2003, in International Application No. PCT/JP02/02411.
Search Report Issued in International Application No. PCT/JP02/02411, Jul. 9, 2002.

* cited by examiner

Primary Examiner—Harold Pyon
Assistant Examiner—Sow-Fun Hon
(74) Attorney, Agent, or Firm—Buchanan Ingersoll PC

(57) ABSTRACT

A polymer film is used as an optical compensatory sheet or a support thereof. The polymer film contains a rod-like compound. The rod-like compound in the form of a solution gives an ultraviolet absorption spectrum. In the spectrum, the wavelength of λmax at the maximum absorption peak is shorter than 250 nm. The spectrum of the rod-like compound is measured when the rod-like compound is in the form of solution. The polymer film has an Rth retardation value of Rth450 measured at the wavelength of 450 nm in the range of 30 to 160 nm. The polymer film also has an Rth retardation value of Rth590 measured at the wavelength of 590 nm in the range of 50 to 200 nm. The values of the Rth450 and Rth590 satisfy the condition of Rth590−Rth450≧2 nm.

22 Claims, No Drawings

OPTICAL COMPENSATORY SHEET COMPRISING POLYMER FILM

This application is a 371 of PCT/JP03/04998 filed Apr. 18, 2003.

FIELD OF INVENTION

The present invention relates to an image-displaying device, particularly an optical compensatory sheet and a polarizing plate that can improve the recognizability and the viewing angle of liquid crystal display. Also, the invention relates to an image-displaying device improved in both recognizability and viewing angle.

BACKGROUND OF INVENTION

A liquid crystal display generally comprises a polarizing plate and a liquid crystal cell.

Since the liquid crystal display has a narrow viewing angle, it has been proposed to use an optical compensatory sheet for enlarging the viewing angle (for example, in Japanese Patent provisional Publication Nos. 4(1992)-229828, 4(1992)-258923, 6(1994)-75116, 6(1994)-174920 and 6(1994)-222213).

A TFT liquid crystal display of TN mode (which is nowadays mainly used) is equipped with an optical compensatory sheet comprising a support and a thereon-provided optically anisotropic layer formed from liquid crystal compound. The optical compensatory sheet is placed between the polarizing plate and the liquid crystal cell, to optically compensate the viewing angle dependence of; the cell so that the quality of displayed image may be improved. That compensatory sheet is described in, for example, 8(1996)-50206.

Also, a wide-viewing angle polarizing plate comprising a birefringencial layer as a protective film is proposed to prevent the plate itself from leaking light when obliquely seen. That plate is described in, for example, 10(1998)-48420.

SUMMARY OF INVENTION

Recently, liquid crystal displays have been used in various fields. As the displays become used for many purposes, their displaying screens are getting larger and larger. The display with a large screen of 17-inches or more often suffers troubles that were already solved by prior arts in a conventional display with a small screen. The troubles are, for example, fluctuations of displayed image qualities (contrast, color and tone), and particularly it is getting more and more wanted to avoid the fluctuation of color.

The inventor also found that, in the case where a polarizing plate equipped with the aforementioned optical compensatory sheet as the protective film is attached on a large display panel of 17-inches or more, the light leakage caused by thermal distortion is not fully prevented. It is, therefore, necessary for the optical compensatory sheet to have not only the function of optically compensating the liquid crystal cell but also excellent durability against change of the environmental conditions.

An object of the present invention is to effectively compensate a liquid crystal display even if it has a large displaying screen.

Another object of the invention is to give a polarizing plate an optical compensating function without increasing elements of the plate.

A further object of the invention is to provide a liquid crystal display having a large displaying screen and giving an image with high qualities.

A furthermore object of the invention to optically compensate a liquid crystal cell by means of an optical compensatory sheet excellent in durability.

A still furthermore object of the invention to provide a liquid crystal display prevented from leaking light by means of an optical compensatory sheet placed on one side of the polarizing plate, and thereby to improve qualities of images given by the display.

The present invention provides optical compensatory sheets (1) to (9), a polarizing plate (10) and the image displaying devices (11) and (12).

(1) An optical compensatory sheet which consists of a polymer film containing a rod-like compound, which gives an ultraviolet absorption spectrum, in which the wavelength of λmax at the maximum absorption peak is shorter than 250 nm, said spectrum of the rod-like compound being measured when the rod-like compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm.

(2) An optical compensatory sheet which comprises an optically anisotropic layer and a polymer film, said optically anisotropic layer being formed from a liquid crystal compound, and said polymer film containing a rod-like compound, which gives an ultraviolet absorption spectrum, in which the wavelength of λmax at the maximum absorption peak is shorter than 250 nm, said spectrum of the rod-like compound being measured when the rod-like compound is in the form of a solution, wherein the polymer film has an Rth retardation value of Rth450 measured at the wavelength of 450 nm in the range of.30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm.

The Rth retardation value is defined by the following formula (I):

$$Rth=\{(nx+ny)/2-nz\} \times d \quad (I)$$

in which nx is a refractive index along the show axis in the film plane; ny is a refractive index along the fast axis in the film plane; nz is a refractive index along the depth of the film; and d is thickness of the film in terms of nm.

(3) The optical compensatory sheet of (1) or (2), wherein the polymer film has an Re retardation value of Re450 measured at the wavelength of 450 nm in the range of 10 to 60 nm, and an Re retardation value of Re590 measured at the wavelength of 590 nm in the range of 20 to 70 nm, said values of Re450 and Re590 satisfying the condition of Re590-Re450≧2 nm.

The Re retardation value is defined by the following formula (II):

$$Re=(nx-ny) \times d \quad (II)$$

in which nx is a refractive index along the show axis in the film plane, ny is a refractive index along the fast axis in the film plane, and d is thickness of the film in terms of nm.

(4) The optical compensatory sheet of (1) or (2), wherein the polymer film is made of cellulose ester._

(5) The optical compensatory sheet of (1) or (2), wherein the polymer film is a film stretched with a stretching ratio of 3 to 100%.

(6) The optical compensatory sheet of (1) or (2), wherein the rod-like compound has a linear molecular structure.

(7) The optical compensatory sheet of (1) or (2), wherein the rod-like compound is liquid crystal.

(8) The optical compensatory sheet of (1) or (2), wherein the rod-like compound is represented by the formula (III):

$$Ar^1\text{-}L^1\text{-}Ar^2 \quad (III)$$

in which each of $Ar^1$ and $Ar^2$ independently is an aromatic group; and $L^1$ is a divalent linking group selected from the group consisting of an alkylene group, an alkenylene group, an alkynylene group, a divalent saturated heterocyclic group, —O—, —CO— and a combination thereof.

(9) The optical compensatory sheet of (7), wherein the rod-like compound is represented by the formula (IV):

$$Ar^1\text{-}L^2\text{-}X\text{-}L^3\text{-}Ar^2 \quad (IV)$$

in which each of $Ar^1$ and $Ar^2$ independently is an aromatic group; each of $L^2$ and $L^3$ independently is a divalent linking group selected from the group consisting of an alkylene group, —O—, —CO— and a combination thereof; and X is 1,4-cyclohexylene, vinylene or ethynylene.

(10) A polarizing plate comprising a pair of transparent protective films and a polarizing membrane provided between the transparent protective films, wherein at least one of the protective films is an optical compensatory sheet of (1) or (2), and wherein the optical compensatory sheet and the polarizing membrane are so placed that the transmission axis of the membrane is parallel or perpendicular to the slow axis of the polymer film.

(11) An image display device having an optical compensatory sheet (1) or (2).

(12) An image display device having a polarizing plate (10).

A liquid crystal display generally comprises a pair of polarizing plates placed in cross-Nicol arrangement (so that the transmission axes of the plates may be perpendicularly crossed). When the plates placed in cross-Nicol arrangement are obliquely seen, the appearing angle between the axes is not seen to be 90° and consequently the plates leak light. Although a convention optical compensatory sheet (for example, described in Japanese Patent Provisional Publication No. 10(1998)-48420) can prevent the light leakage, it undesirably colors the displayed image. The inventor has found this undesirable coloring is caused by the wavelength dispersion of the compensatory sheet. Accordingly, for preventing the undesirable coloring, it is necessary for the compensatory sheet to increase retardation in proportion to increase of the wavelength.

It is already known to use a retardation-increasing agent for adjusting the retardation, but conventional retardation-increasing agents often give retardation deviated from the aimed values particularly in a short-wavelength range.

The inventor has studied and finally found that, if a rod-like compound giving the maximum absorption peak at a wavelength (λmax) shorter than 250 nm in its ultraviolet absorption spectrum when the compound is in the form of solution is used as a retardation-increasing agent, the retardation can be adequately adjusted in a wide wavelength region including a short-wavelength range.

Consequently, the invention reduces the color fluctuation depending upon the viewing angle. In particular, the invention effectively improves the qualities of image given by a large liquid crystal display.

DETAILED DESCRIPTION OF INVENTION (Retardation of Polymer Film)

The polymer film has an Rth retardation value measured at the wavelength of 450 nm (Rth450) in the range of 30 to 160 nm, and an Rth retardation value measured at the wavelength of 590 nm (Rth590) in the range of 50 to 200 nm. The Rth450 and the Rth590 satisfy the condition of Rth590-Rth450≧2 nm, preferably Rth590-Rth450≧5 nm, and more preferably Rth590-Rth450≧10 nm.

Preferably, the polymer film has a Rth retardation value measured at the wavelength of 450 nm (Rth450) in the ranges of 45 to 150 nm, another Rth retardation value measured at the wavelength of 550 nm (Rth550) in the ranges of 55 to 180 nm, and still another Rth retardation value measured at the wavelength of 590 nm (Rth590) in the ranges of 70 to 185 nm. They preferably satisfy the condition of Rth590-Rth450≧2 nm, more preferably satisfy the condition of Rth590-Rth550≧2 nm, most preferably satisfy the condition of Rth590-Rth550≧2 nm. It is also preferred to satisfy the condition of Rth550-Rth450≧10 nm.

The Rth retardation value is defined by the following formula (I):

$$Rth=\{(nx+ny)/2-nz\}\times d \quad (I)$$

in which nx is a refractive index along the show axis in the film plane, ny is a refractive index along the fast axis in the film plane, nz is a refractive index along the depth of the film, and d is thickness of the film in terms of nm.

Further, the polymer film has a Re retardation value measured at the wavelength of 450 nm (Re450) in the ranges of 10 to 60 nm, and another Re retardation value measured at the wavelength of 590 nm (Rth590) in the ranges of 20 to 70 nm. The Re450 and the Re590 satisfy the condition of Re590-Re450≧0.2 nm, preferably Re590-Re450≧1 nm, and more preferably Re590-Re450≧2 nm.

Preferably, the polymer film has a Re retardation value measured at the wavelength of 450 nm (Re450) in the ranges of 15 to 50 nm, another Re retardation value measured at the wavelength of 550 nm (Re550) in the ranges of 20 to 60 nm, and still another Re retardation value measured at the wavelength of 590 nm (Re590) in the ranges of 25 to 70 nm. They preferably satisfy the condition of Re590-Re550≧0.2 nm, more preferably satisfy the condition of Re590-Re550≧0.5 nm, most preferably satisfy the condition of Re590-Re550≧1 nm. It is also preferred to satisfy the condition of Re550-Re450≧2 nm.

The Re retardation value is defined by the following formula (II):

$$Re=(nx-ny)\times d \quad (II)$$

in which nx is a refractive index along the show axis in the film plane, ny is a refractive index along the fast axis in the film plane, and d is thickness of the film in terms of nm.

(Polymer)

The polymer film is preferably made of a polymer having a light-transmittance of 80% or more. Examples of the polymer include cellulose esters (e.g., cellulose acetate), norbornene-based polymers, polyacrylic esters, polymethacrylic esters (e.g., polymethyl methacrylate), polycarbonates and polysulfones. Commercially available polymers such as Artone and Zeonex (norbornene-based polymers) may be used.

Cellulose esters are preferred, and cellulose esters of lower fatty acids are more preferred. Here, the term "lower fatty acids" means fatty acids having 6 or less carbon atoms. The number of carbon atoms is preferably 2 (cellulose acetate), 3 (cellulose propionate) or 4 (cellulose butyrate). Cellulose esters of mixed fatty acids such as cellulose acetatepropionate and cellulose acetatebutyrate are also usable. Cellulose acetate is particularly preferred.

The acetic acid content of cellulose acetate is preferably in the range of 55.0 to 62.5%, more preferably in the range of 57.0 to 62.0%. The term "acetic acid content" means the amount of combined acetic acid per one unit weight of cellulose. The acetic acid content can be determined according to ASTM: D-817-91 (tests of cellulose acetate).

The cellulose ester has a viscosity average polymerization degree (DP) of preferably 250 or more, more preferably 290 or more. Further, it is also preferred for the cellulose ester used in the invention to have a narrow molecular weight distribution of Mw/Mn (Mw and Mn are weight and number average molecular weights, respectively), which is determined by gel permeation chromatography. The value of Mw/Mn is preferably in the range of 1.0 to 1.7, more preferably in the range of 1.3 to 1.65, most preferably in the range of 1.4 to 1.6.

Generally in a cellulose ester, hydroxyl groups at 2-, 3- and 6-position of cellulose unit are not equally substituted (namely, the substitution degree at each position is not equal to one third of the total substitution degree), and the substitution degree at 6-position is apt to be relatively small. In the cellulose ester used in the invention, the substitution degree at 6-position is preferably not smaller than those at 2- and 3-positions.

The hydroxyl group at 6-position is substituted in an amount of preferably 30% to 40%, more preferably 31% or more, most preferably 32% or more, based on the total substitution degree at 2-, 3- and 6-positions. Further, the substitution degree at 6-position is preferably 0.88 or more. The hydroxyl group at 6-position may be substituted with acyl group other than acetyl. Examples of the other acyl group are acyl groups having 3 or more carbon atoms (e.g., propionyl, butyloyl, valeroyl, benzoyl, acryloyl). The substitution degree at each position can be measured by means of NMR.

The cellulose ester having a high substitution degree at 6-position can be prepared according to the methods described in Japanese Patent Provisional Publication No. 11(1999)-5851.

(Retardation-increasing Agent)

In the invention, a rod-like compound giving the maximum absorption peak at a wavelength (λmax) shorter than 250 nm in its ultraviolet absorption spectrum when the compound is in the form of solution is used as a retardation-increasing agent.

The rod-like compound has preferably at least one aromatic ring, more preferably at least two aromatic rings in its molecular structure, in consideration of the retardation-increasing function.

Further, the rod-like compound preferably has a linear molecular structure. In other wards, it is preferred for the molecule of the compound to be thermally the most stable when it takes a linear posture. What molecular structure is thermally the most stable can be calculated according to the crystal structure analysis or the molecular orbital method. For example, the molecular structure giving the smallest heat of formation can be obtained by calculation according to a molecular orbital calculation program (e.g., WinMOPAC200, Fujitsu, Ltd.). The term "linear molecular structure" means that the thermally most stable molecular structure calculated above has a bending angle of 140° or more even if it is bent.

The rod-like compound preferably behaves as liquid crystal. It is more preferred to behave as liquid crystal when heated (namely, thermotropic liquid crystal). The liquid crystal phase is preferably nematic phase or smectic phase.

The rod-like compound is preferably represented by the following formula (III):

In the formula (III), each of $Ar^1$ and $Ar^2$ is independently an aromatic group.

The term "an aromatic group" in the specification means an aryl (aromatic hydrocarbon) group, a substituted aryl group, an aromatic heterocyclic group or a substituted aromatic heterocyclic group.

An aryl group and a substituted aryl group are preferred to an aromatic heterocyclic group and a substituted aromatic heterocyclic group. The aromatic heterocyclic group preferably comprises a five-membered, six-membered or seven-membered (more preferably five-membered or six-membered) aromatic heterocyclic ring. The aromatic heterocyclic ring is generally unsaturated and has double bonds as many as possible. The hetero atom in the heterocyclic group is preferably nitrogen, oxygen or sulfur atom, more preferably nitrogen or sulfur atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

The aromatic ring in the aromatic group preferably is benzene ring, furan ring, thiophene ring, pyrrole ring, oxazole ring, thiazole ring, imidazole ring, triazole ring, pyridine ring, pyrimidine ring or pyrazine ring. Benzene ring is particularly preferred.

Examples of the substituent group of the substituted aryl or substituted aromatic heterocyclic group include a halogen atom (F, Cl, Br, I), hydroxyl, carboxyl, cyano, amino, an alkylamino group (e.g., methylamino, ethylamino, butylamino, dimethylamino), nitro, sulfo, carbamoyl, an alkylcarbamoyl group (e.g., N-methylcarbamoyl, N-ethylcarbamoyl, N,N-dimethylcarbamoyl), sulfamoyl, an alkylsulfamoyl group (e.g., N-methylsulfamoyl, N-ethylsulfamoyl, N,N-dimethylsulfamoyl), ureido, an alkylureido group (e.g., N-methylureido, N,N-dimethylureido, N,N,N'-trimethylureido), an alkyl group (e.g., methyl, ethyl, propyl, butyl, pentyl, heptyl, octyl, isopropyl, s-butyl, t-amyl, cyclohexyl, cyclopentyl), an alkenyl group (e.g., vinyl, allyl, hexenyl), an alkynyl group (e.g., ethynyl, butynyl), an acyl group (e.g., formyl, acetyl, butyryl, hexanoyl, lauryl), an acyloxy group (e.g., acetoxy, butyryloxy, hexanoyloxy, lauryloxy), an alkoxy group (e.g., methoxy, ethoxy, propoxy, butoxy, pentyloxy, heptyloxy, oxtyloxy), an aryloxy group (e.g., phenoxy), an alkoxycarbonyl group (e.g., methoxycarbonyl, ethoxycarbonyl, propoxycarbonyl, butoxycarbonyl, pentyloxycarbonyl, heptyloxycarbonyl), an aryloxycarbonyl group (e.g., phenoxycarbonyl), an alkoxycarbonylamino group (e.g., butoxycarbonylamino, hexyloxycarbonylamino), an alkylthio group (e.g., methylthio, ethylthio, propylthio, butylthio, pentylthio, heptylthio, octylthio), an arylthio group (e.g., phenylthio), an alkylsulfonyl group (e.g., methylsulfonyl, ethylsulfonyl, propylsulfonyl, butylsulfonyl, pentylsulfonyl, heptylsulfonyl, octylsulfonyl), an amido group (e.g., acetamido, butylamido, hexylamido, laurylamido), and a non-aromatic heterocyclic group (e.g., morpholino, pyrazinyl).

Preferred substituent groups of the substituted aryl or substituted aromatic heterocyclic group are a halogen atom, cyano, carboxyl, hydroxyl, amino, an alkyl-substituted amino group, an acyl group, an acyloxy group, an amido group, an alkoxycarbonyl group, an alkoxy group, an alkylthio group and an alkyl group.

The alkyl group and the alkyl moiety of the alkylamino group, the alkoxycarbonyl group or the alkoxy group may further have a substituent group. Examples of the substituent group of alkyl group or moiety include a halogen atom, hydroxyl, carboxyl, cyano, amino, an alkylamino group, nitro, sulfo, carbamoyl, an alkylcarbamoyl group, sulfamoyl, an alkylsulfamoyl group, ureido, an alkylureido group, an alkenyl group, an alkynyl group, an acyl group, an acyloxy group, an alkoxy group, an aryloxy group, an alkoxycarbonyl group, an aryloxycarbonyl group, an alkoxy-carbonylamino group, an alkylthio group, an arylthio group, an alkylsulfonyl group, an amido group, and a non-aromatic heterocyclic group. Preferred substituent groups of alkyl group or moiety are a halogen atom, hydroxyl, amino, an alkylamino group, an acyl group, an acyloxy group, an acylamino group, an alkoxycarbonyl group, and an alkoxy group.

In the formula (III), $L^1$ is a divalent linking group selected from the group consisting of an alkylene group, an alkenylene group, an alkynylene group, a divalent saturated heterocyclic group, —O—, —CO— and combinations thereof.

The alkylene group may have a cyclic structure. As the cyclic alkylene group, cyclohexylene is preferred and 1,4-cyclohexylene is particularly preferred. If the alkylene group has a chain structure, a straight chain structure is preferred to a branched one.

The alkylene group has preferably 1 to 20 carbon atoms, more preferably 1 to 15 carbon atoms, further preferably 1 to 10 carbon atoms, furthermore preferably 1 to 8 carbon atoms, most preferably 1 to 6 carbon atoms.

The alkenylene group or the alkynylene group preferably has a chain structure, more preferably a straight chain structure.

The alkenylene group or the alkynylene group has preferably 2 to 10 carbon atoms, more preferably 2 to 8 carbon atoms, further preferably 2 to 6 carbon atoms, furthermore preferably 2 to 4 carbon atoms, most preferably 2 carbon atoms (namely, the alkenylene group or the alkynylene group is most preferably vinylene or ethynylene, respectively).

The divalent saturated heterocyclic group preferably has a 3- to 9-membered heterocyclic ring. The hetero-atom in the heterocyclic group is preferably oxygen, nitrogen, boron, sulfur, silicon, phosphorus or germanium atom. Examples of the saturated heterocyclic ring include piperidine ring, piperadine ring, morphorine ring, pyrrolidine ring, imidazoline ring, tetrahydrofuran ring, tetrahydropyran ring, 1,3-dioxane ring, 1,4-dioxane ring, tetrahydrothiophene ring, 1,3-thiazolidine ring, 1,3-oxazolidine ring, 1,3-dioxolan ring, 1,3-dithiolan ring and 1,3,2-dioxaborane. Particularly preferred divalent saturated heterocyclic groups are piperadine-1,4-diylene, 1,3-dioxane-2,5-diylene and 1,3,2-dioxaborane-2,5-diylene.

Examples of the combined divalent linking group are shown below.

L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO-Ht-CO—O—
L-8: —CO—O-Ht-O—CO—

(Remark)

Ht: Divalent saturated heterocyclic group

In the molecular structure represented by the formula (III), the angle between $Ar^1$-$L^1$ and $L^1$-$Ar^2$ is 140° or more.

The rod-like compound is more preferably represented by the following formula (IV):

$$Ar^1\text{-}L^2\text{-}X\text{-}L^3\text{-}Ar^2. \tag{IV}$$

In the formula (IV), each of $Ar^1$ and $Ar^2$ is independently an aromatic group. The $Ar^1$ and $Ar^2$ are the same as those in the formula (III).

In the formula (IV), each of $L^2$ and $L^3$ is independently a divalent linking group selected from the group consisting of an alkylene group, —O—, —CO— and combinations thereof.

The alkylene group preferably has a chain structure, and a straight chain structure is preferred to a branched one.

The alkylene group has preferably 1 to 10 carbon atoms, more preferably 1 to 8 carbon atoms, further preferably 1 to 6 carbon atoms, furthermore preferably 1 to 4 carbon atoms, most preferably 1 to 2 carbon atoms (namely, the alkylene group is most preferably methylene or ethylene).

Each of $L^2$ and $L^3$ is particularly preferably —O—CO— or —CO—O—.

In the formula (IV), X is 1,4-cyclohexylene, vinylene or ethynylene.

Examples of the compound represented by the formula (III) are as follows.

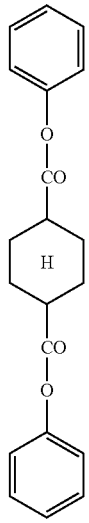

(1)

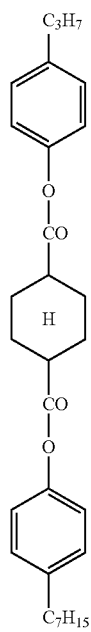 (1)
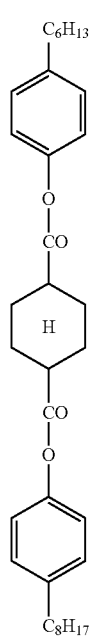
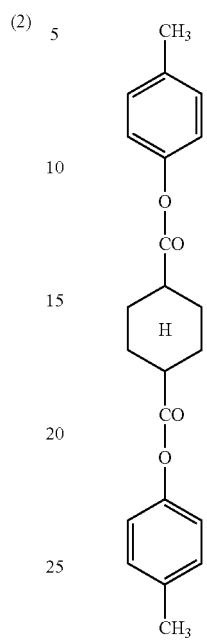 (2)
(3)
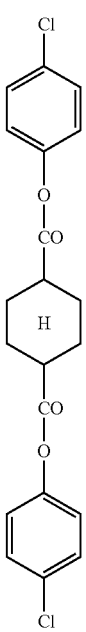 (4)
(5)

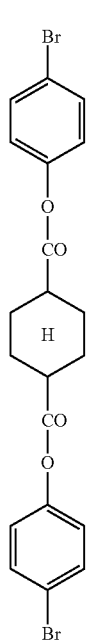 (6)
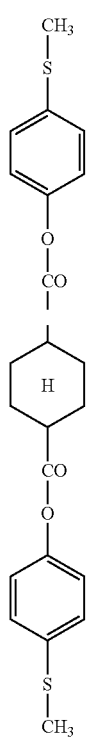 (7)
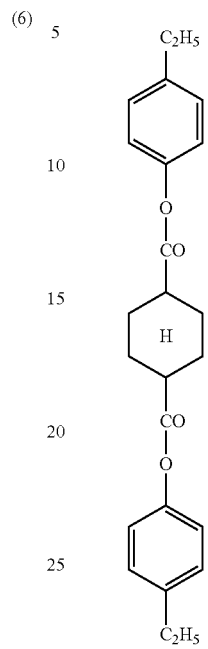 (8)
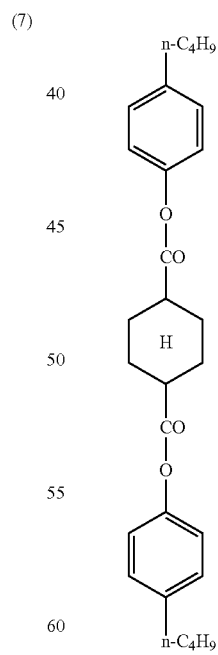 (9)

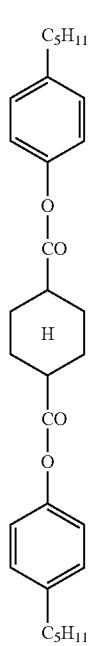
(10)
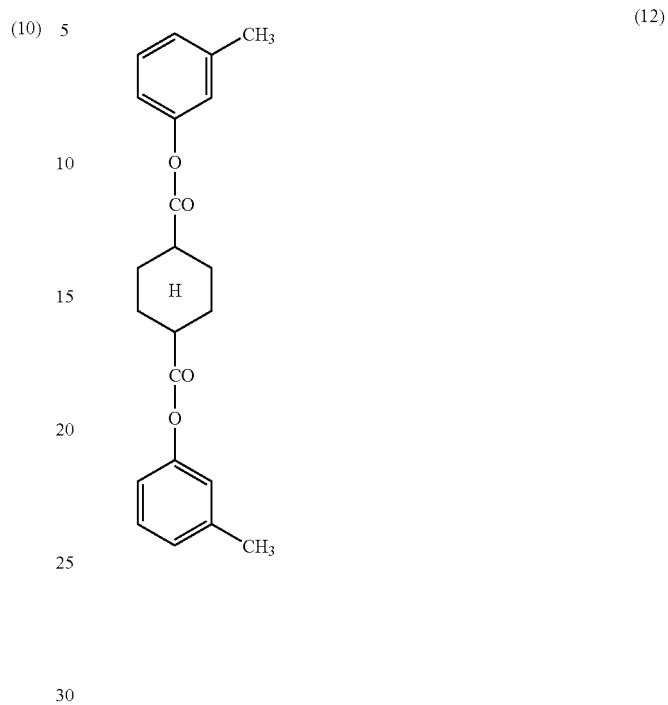
(11)
(12)
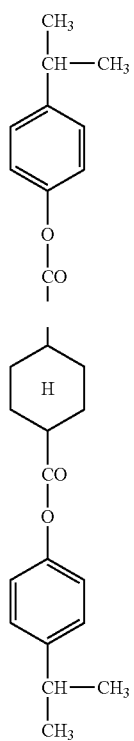
(13)
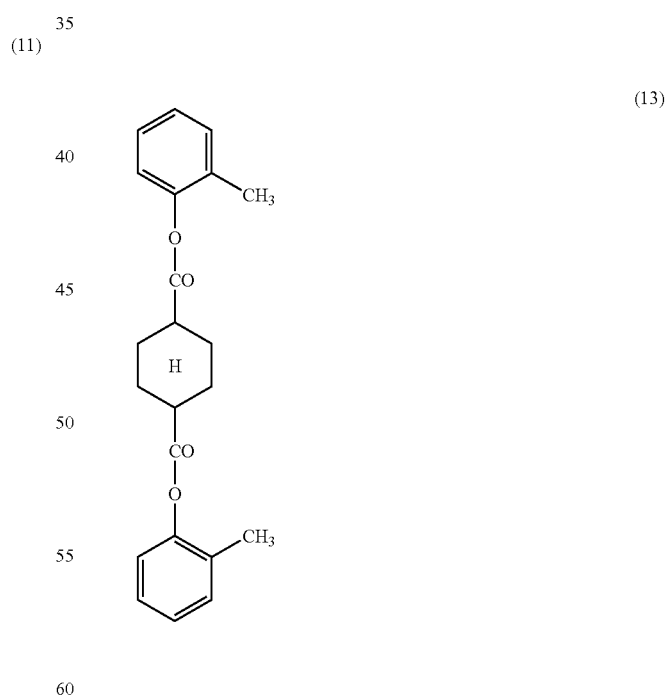

-continued
(14)
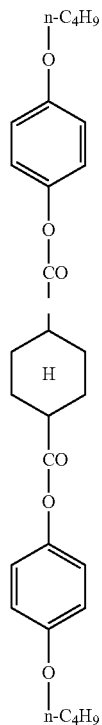
(16)
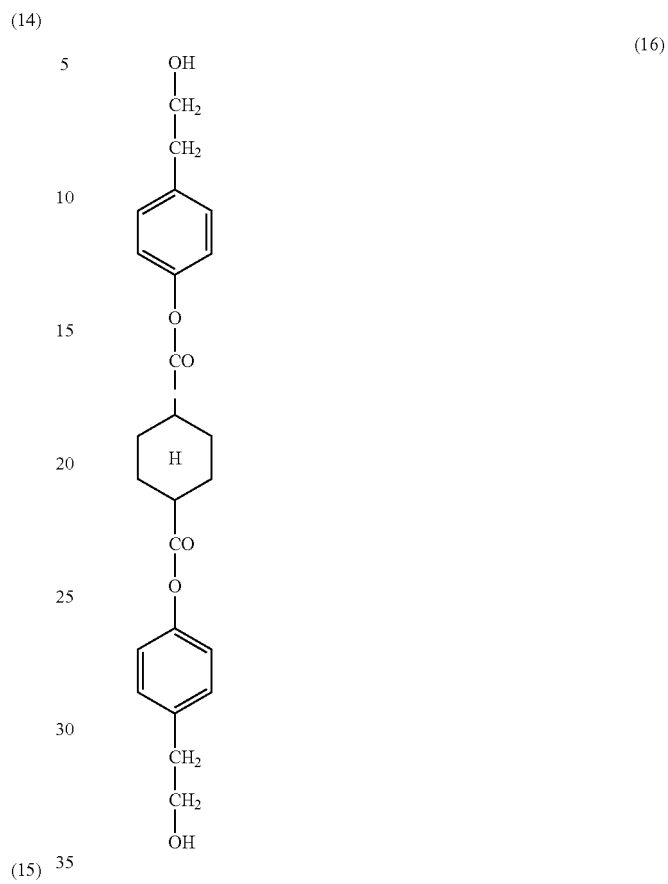
(15)
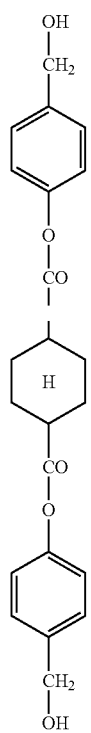
(17)
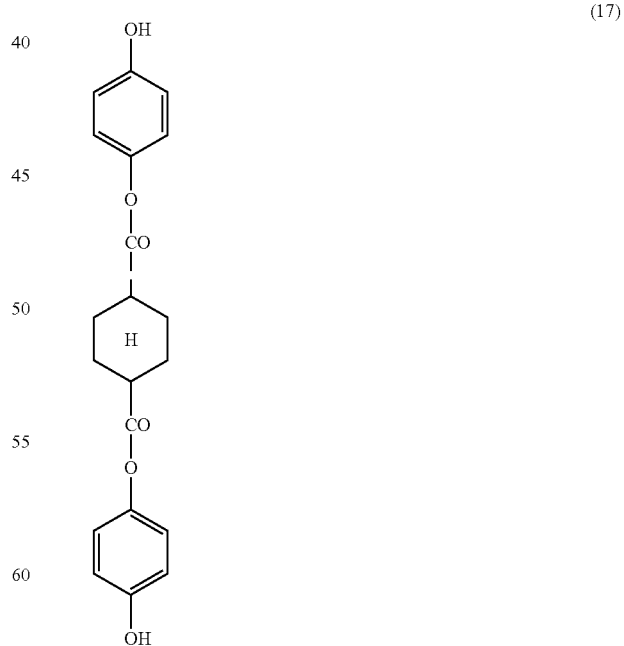

(18)
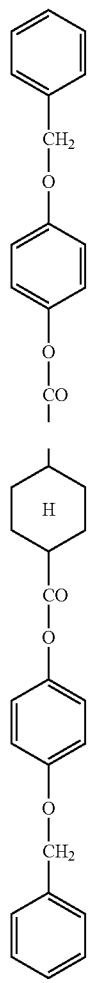
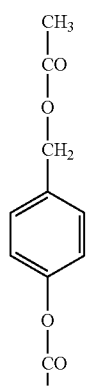
(19)
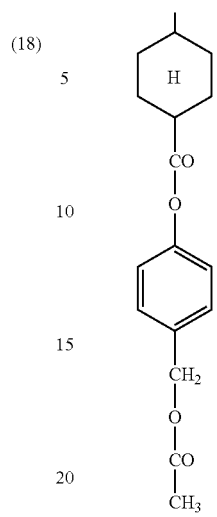
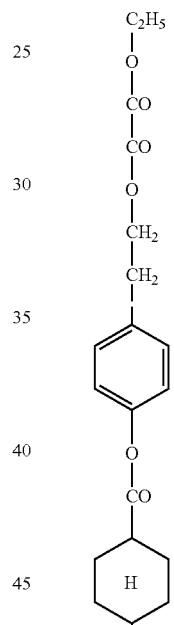
(20)
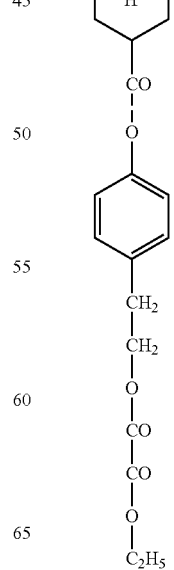

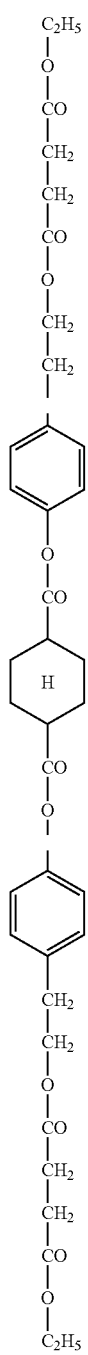
(21)
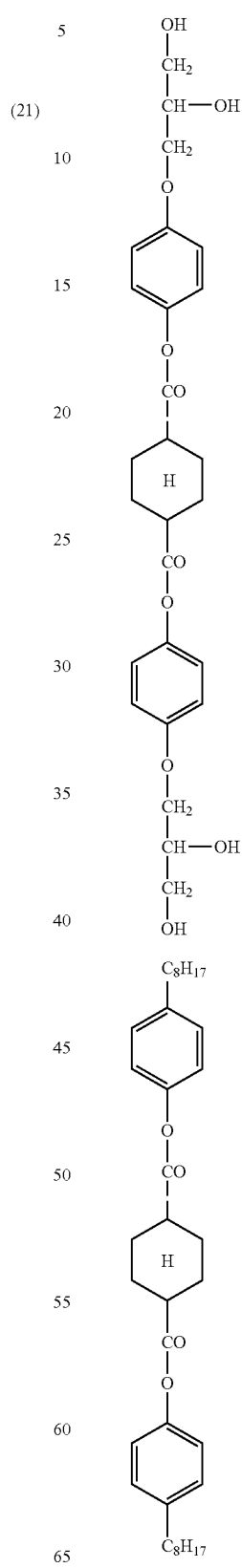
(22)
(23)

-continued
(24)
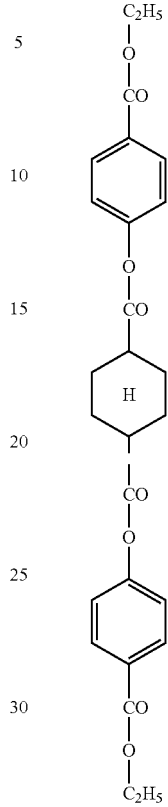
(26)
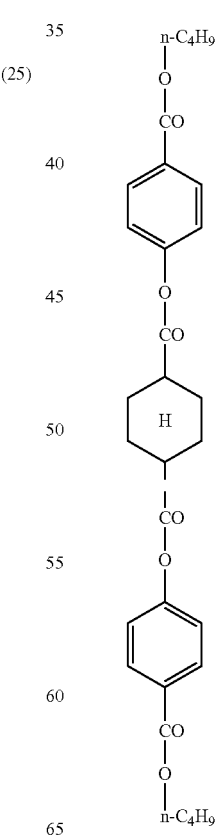
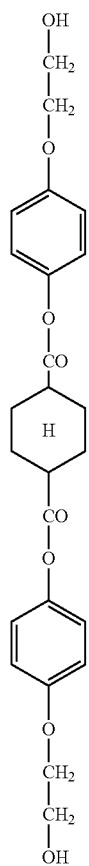
(25)
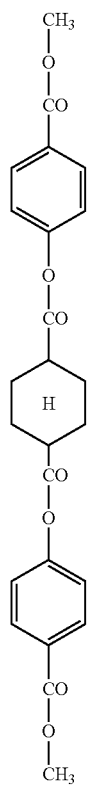
(27)

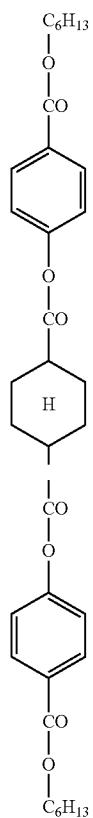 (28)
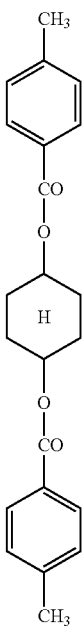 (30)
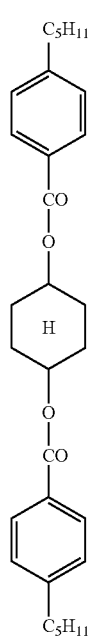 (29)
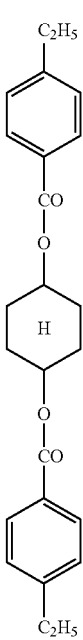 (31)

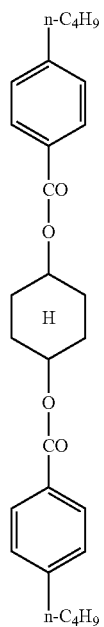
(32)
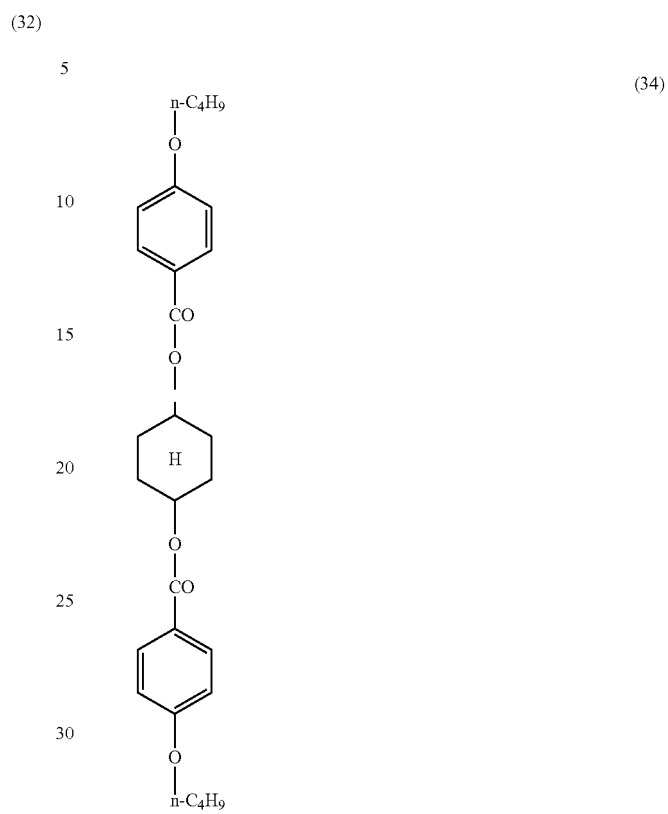
(33)
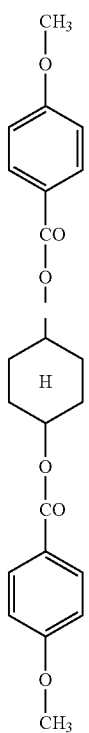
(34)
(35)
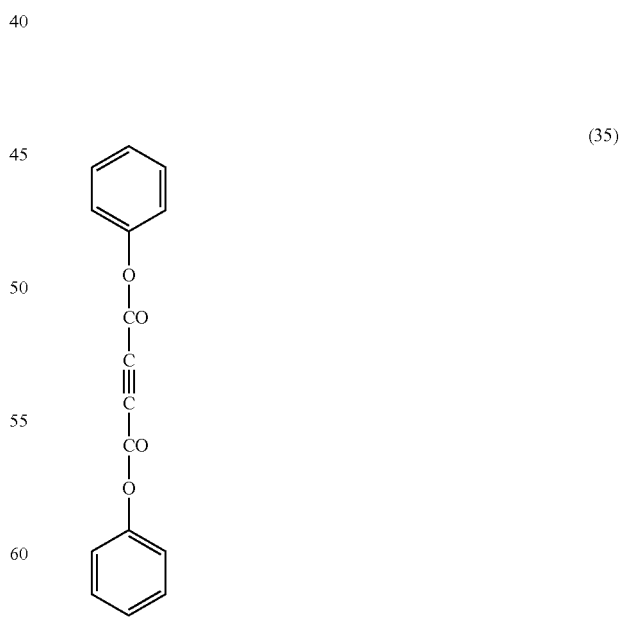

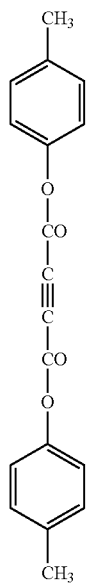
(36)
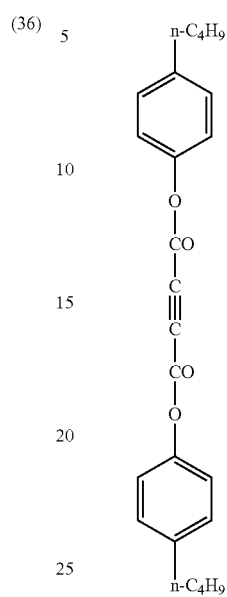
(37)
(38)
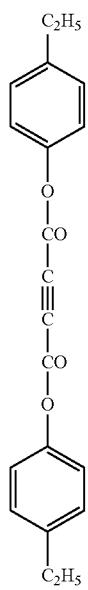
(39)
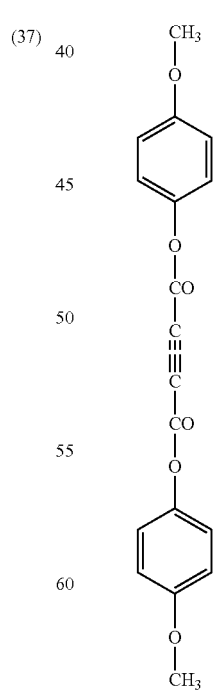

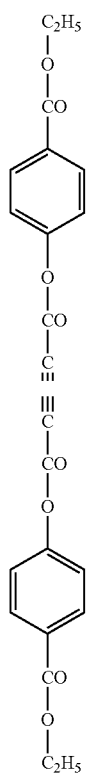 (40)
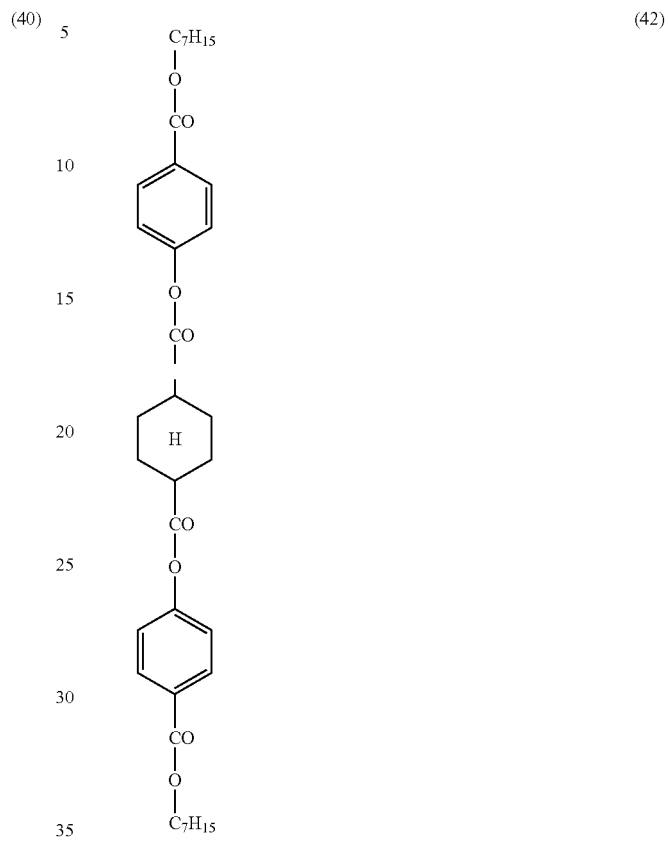
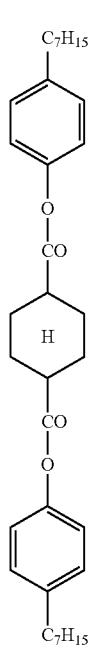 (41)
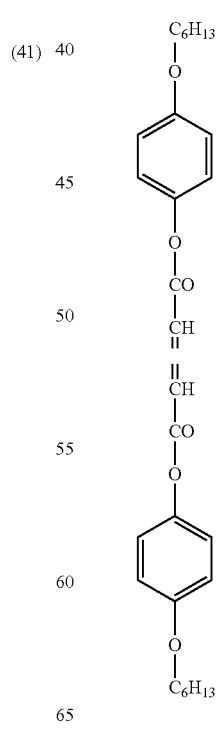

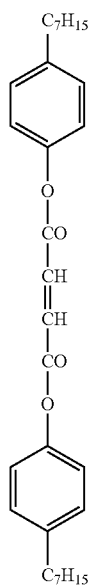
(44)
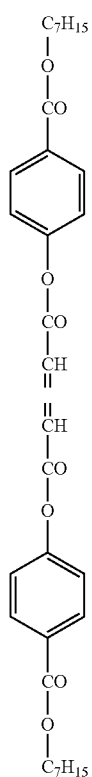
(45)
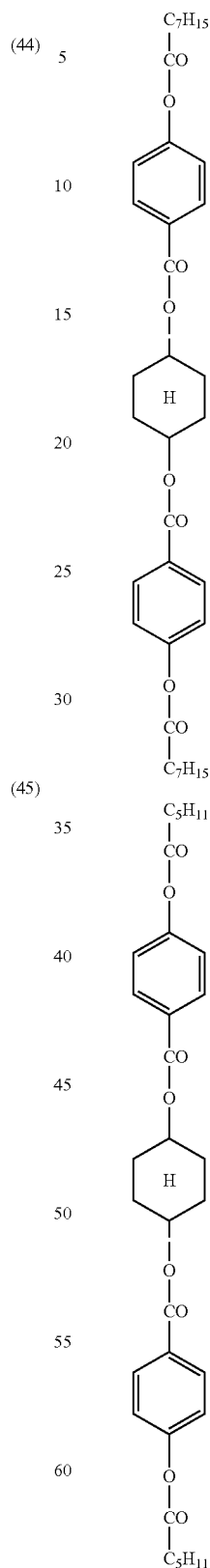
(46)
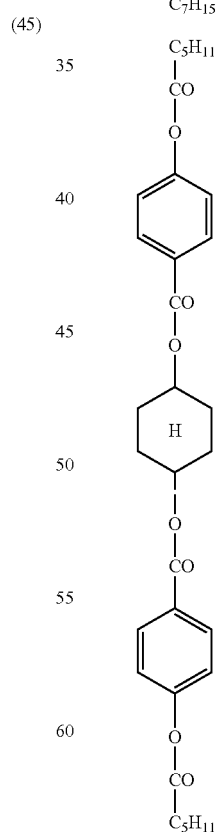
(47)

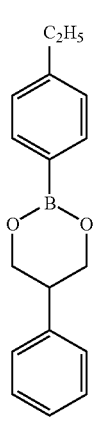
(48)
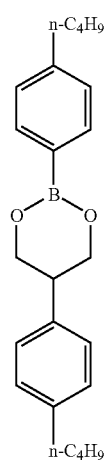
(49)
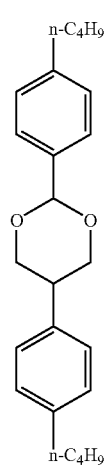
(50)
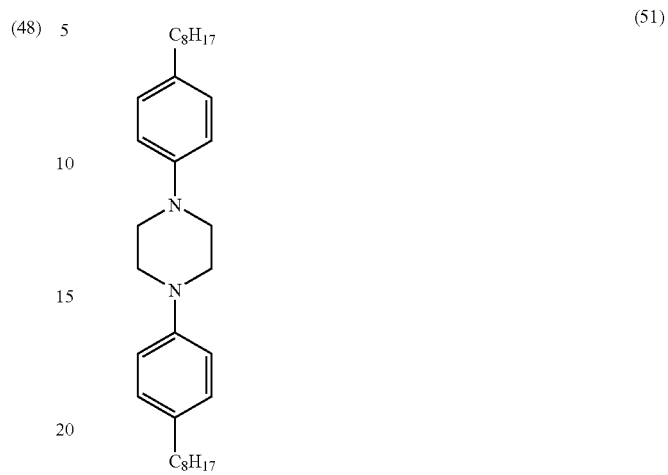
(51)
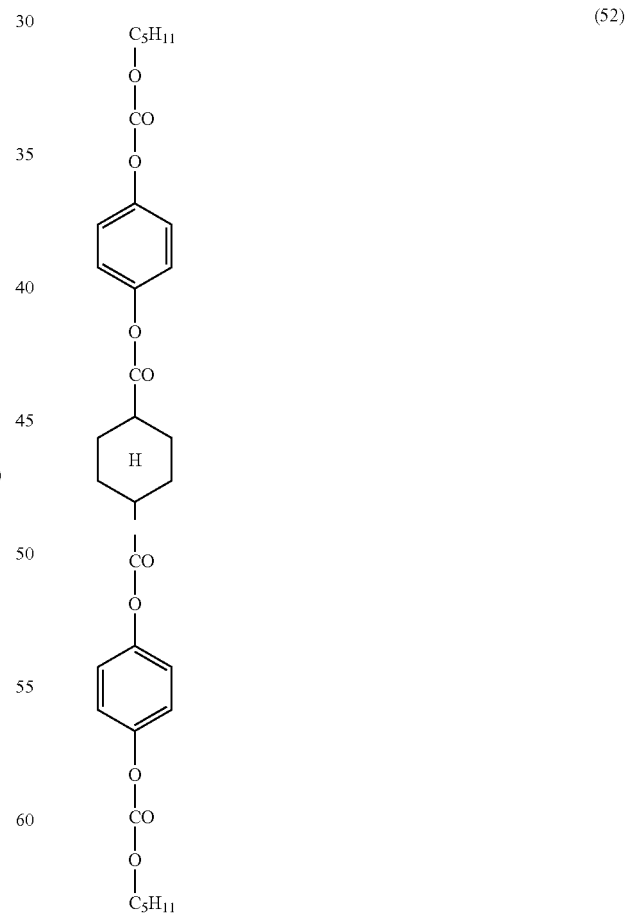
(52)

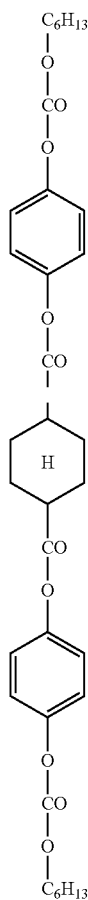

(53)

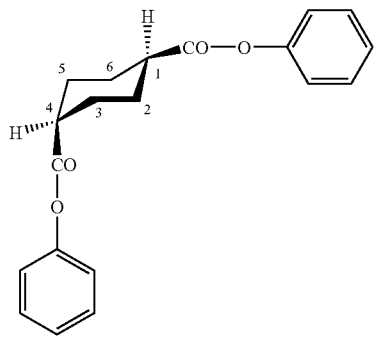

Each of the above (1) to (34), (41), (42), (46), (47), (52) and (53) has two asymmetric carbons at the 1- and 4-positions of cyclohexane ring. In spite of that, each compound of (1), (4) to (34), (41), (42), (46), (47), (52) and (53) has a symmetrical meso type-molecular structure, and hence has no optical (active) isomer but geometrical isomers (trans and cis-forms). The trans-form (1-trans) and cis-form (1-cis) of the above compound (1) are shown below.

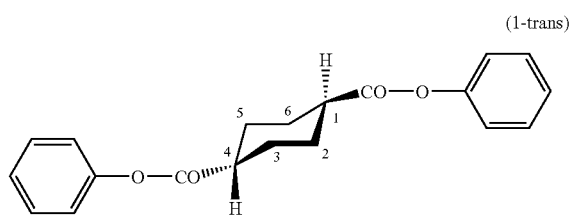

(1-trans)

(1-cis)

The rod-like compound preferably has a linear molecular structure, as described above. Accordingly, the transform is preferred to the cis-form.

Each of the above compounds (2) and (3) has not only geometrical isomers but also optical isomers (four isomers in total). With respect to the geometrical isomers, the trans-form is preferred to the cis-form. However, in view of the function, there is little difference between the optical isomers, and hence either D- or L-body may be used. Further, it may be racemate.

Each compound of (43) to (45) has trans- and cis-forms in connection with a vinylene bond at the central position. For the above-described reason, the trans-form is preferred to the cis-form.

Two or more rod-like compounds (each of which gives the maximum absorption peak at a wavelength ($\lambda$max) shorter than 250 nm in its ultraviolet absorption spectrum in the form of solution) may be used in combination.

The rod-like compound can be prepared according to the methods described in, for example, Mol. Cryst. Liq. Cryst., 53(1979), pp. 229; ibid., 89(1982), pp. 93; ibid., 145(1987), pp. 111; ibid., 170(1989), pp. 43; J. Am. Chem. Soc., 113(1991), pp. 1349; ibid., 118(1996), pp. 5346; ibid., 92(19i0), pp. 1582; J. Org. Chem., 40(1975), pp. 420; and Tetrahedron, 48(1992), No. 16, pp. 3437.

The retardation-increasing agent is incorporated in an amount of preferably 0.1 to 30 wt. %, more preferably 0.5 to 20 wt. %, based on the amount of the polymer.

(Preparation of Polymer Film)

The polymer film is preferably prepared according to solvent cast method. In the solvent cast method, a solution (dope) in which the polymer is dissolved in an organic solvent is used.

Examples of the organic solvent include an ether having 2 to 12 carbon atoms, a ketone having 3 to 12 carbon atoms, an ester having 2 to 12 carbon atoms, and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is the compound having two or more functional groups, the number of carbon atoms is in any of the above ranges.

Examples of the ether having 2 to 12 carbon atoms include dimethyl ether, diisopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methylethyl ketone, diethyl ketone, diisobutyl ketone, cyclohexanone and methylcyclohexane.

Examples of the ester having 2 to 12 carbon atoms include methyl formate, ethyl formate, propyl formate, pentyl formate, methyl acetate, ethyl acetate, and pentyl acetate.

Examples of the compound having two or more functional groups include 2-ethoxyethyl acetate, 2-methoxyethanol and 2-butoxyethanol.

A typical example of the halogenated hydrocarbon having 1 to 6 carbon atoms is methylene chloride. From the technical viewpoint, the halogenated hydrocarbon such as methylene chloride can be used without any problem. However, in consideration of the global environment and working conditions, the organic solvent preferably contains essentially no halogenated hydrocarbon. This means the organic solvent preferably contains halogenated hydrocarbon in an amount of less than 5 wt. % (more preferably less than 2 wt. %). Also preferably, halogenated hydrocarbon such as methylene chloride is not found in the resultant film at all.

Two or more organic solvents may be mixed to use. In that case, alcohol or hydrocarbon can be used in addition to the above ether, ketone, ester or halogenated hydrocarbon.

The alcohol preferably has a boiling point of 30 to 170° C., and is preferably a monohydric alcohol. The hydrocarbon moiety of the alcohol may have a branched structure or a cyclic structure, and is preferably a saturated aliphatic hydrocarbon. The hydroxyl of the alcohol may be primary, secondary or tertiary.

Examples of the alcohol include methanol (b.p.: 64.65° C.), ethanol (78.325° C.), 1-propanol (97.14° C.), 2-propanol (82.4° C.), 1-butanol (117.9° C.), 2-butanol (99.5° C.), t-butanol (82.45° C.), 1-pentanol (137.5° C.), 2-methyl-2-butanol (101.9° C.), cyclohexanol (161° C.), 2-fluoroethanol (103° C.), 2,2,2-trifluoroethanol (80° C.), 2,2,3,3-tetrafluoro-1-propanol (109° C.), 1,3-difluoro-2-propanol (55° C.), 1,1,1,3,3,3-hexa-2-methyl-2-propanol (62° C.), 1,1,1,3,3,3-hexafluoro-2-propanol (59° C.), 2,2,3,3,3-pentafluoro-1-propanol (80° C.), 2,2,3,3,4,4,4-hexafluoro-1-butanol (114° C.), 2,2,3,3,4,4,4-heptafluoro-1-butanol (97° C.), perfluoro-tert-butanol (45° C.), 2,2,3,3,4,4,5,5-octafluoro-1-pentanol (142° C.), 2,2,3,3,4,4-hexafluoro-1,5-pentanediol (111.5° C.), 3,3,4,4,5,5,6,6,7,7,8,8,8-tridecafluoro-1-octanol (95° C.), 2,2,3,3,4,4,5,5,6,6,7,7,8,8,8-pentadecafluoro-1-octanol (165° C.), 1-(pentafluorophenyl)ethanol (82° C.) and 2,3,4,5,6-pentafluorobenzyl alcohol (115° C.).

The hydrocarbon preferably has a boiling point of 30 to 170° C., and may have a branched structure or a cyclic structure. Either an aromatic hydrocarbon or an aliphatic one can be used. The aliphatic hydrocarbon may be unsaturated. Examples of the hydrocarbon include cyclohexane (b.p.: 80.7° C.), hexane (69° C.), benzene (80.° C.), toluene (110.1° C.) and xylene (138.4° C. to 144.4° C.).

When the polymer is dissolved in the solvent in a container, the container may be filled with inert gas such as nitrogen gas. The prepared polymer solution (dope) must be viscous enough to form a film when cast on a support. The viscosity of the dope immediately before casting is normally in the range of 10 to 2,000 ps·s, preferably in the range of 30 to 400 ps·s.

The polymer solution (dope) can be prepared according to an ordinary method. The ordinary method means that the solution is prepared at a temperature of not lower than 0° C. (room temperature or elevated temperature). The polymer solution (dope) can be prepared through a common process by means of a common apparatus in the normal solvent cast method. In the normal process, a halogenated hydrocarbon (particularly, methylene chloride) is preferably used as the solvent.

The amount of the polymer in the solution is preferably in the range of 10 to 40 wt. %, more preferably in the range of 10 to 30 wt. %. To the organic (main) solvent, additives described below may be optionally added.

The polymer and the organic solvent are mixed and stirred at room temperature (0 to 40° C.) to prepare the solution. For preparing the concentrated solution, the preparation may be carried out at an elevated temperature under a high pressure. In that case, the polymer and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Further, the components can be added to the vessel at a high pressure after the vessel is sealed.

The vessel is preferably heated from outside. For example, a jacket heater is preferably used. Otherwise, liquid heated with a plate-heater placed outside of the vessel may be circulated through a pipe wound around the vessel, to heat the whole vessel.

The mixture is preferably stirred with a propeller mixer provided in the vessel. The wing of the propeller preferably has a length reaching the inside wall of the vessel. Further, at the tip of-the wing, a scratching mean is provided to scratch and renew liquid attached on the inside wall.

In the vessel, various meters such as pressure gauge and thermometer may be provided. After the components are dissolved in the solvent in the vessel, the prepared dope may be cooled and then taken out of the vessel, or may be taken out and then cooled with a heat exchanger.

The solution can be prepared according to the cooling dissolution method, which makes it possible to dissolve the polymer in an organic solvent in which the polymer cannot be dissolved by a conventional process. Further, according to the method, the polymer can be rapidly and homogeneously dissolved in an organic solvent in which the polymer can be dissolved by a conventional process.

First in the process of cooling dissolution method, the polymer is gradually added with stirring into an organic solvent at room temperature. The amount of the polymer in the mixture is preferably in the range of 10 to 40 wt. %, more preferably in the range of 10 to 30 wt. %. Various additives described below may be added in the mixture.

The prepared mixture is cooled to a temperature of −100 to −10° C., preferably −80 to −10° C., more preferably −50 to −20° C., most preferably −50 to −30° C. The cooling procedure can be carried out, for example, with dry icemethanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C./second, a technical upper limit is 1,000° C./second, and a practical upper limit is 100° C./second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, the polymer is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C./second, a technical upper limit is 1,000° C./second, and a practical upper limit is 100° C./second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If the polymer is not sufficiently dissolved, the cooling and warming procedures may be repeated. It can be judged by observation with the eyes whether the polymer is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at approx. 33° C. Below that temperature, the solution is in the form of homogeneous gel. The solution, therefore, must be kept at a temperature above the pseudo-phase transition point, preferably at a temperature higher than the pseudo-phase transition point by approx. 10° C. The pseudo-phase transition point depends upon various conditions such as the organic solvent, the acetic acid content, the viscosity average polymerization degree and the concentration of cellulose acetate.

The polymer film is formed from the prepared polymer solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. The procedure can shorten the time taken to complete the steps of cooling to peeling. For performing the procedure, the cast dope must gel at the surface temperature of the drum or band.

Two or more polymer solutions (dopes) may be prepared, and from them two or more layers may be formed by the solvent cast method to prepare a layered polymer film. The dopes are cast on a drum or a band, and the solvent is evaporated to form the film. The solid content of each dope is preferably controlled in the range of 10 to 40%. The surface of the drum or band is preferably beforehand polished to be a mirror.

In the case where two or more polymer solutions are cooperatively cast, two or more outlets are arranged at intervals along the running direction of the support (drum or band), and from each outlet each polymer solution is cast to form a layered film (Japanese Patent Provisional Publication Nos. 61(1986)-158414, 1(1989)-122419 and 11(1999)-198285). Otherwise, polymer solutions may be cast from two outlets to form a film (Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933). Further, a flow of high-viscous polymer solution may be enclosed with a flow of low-viscous one to form a layered flow, and the high- and low-viscous solutions in the layered flow may be simultaneously extruded to produce a film (Japanese Patent Provisional Publication No. 56(1981)-162617).

Further, the method disclosed in Japanese Patent Publication No. 44(1969)-20235 may be adopted. In the disclosed process, a polymer solution is cast on the support from one outlet to form a film. After peeled from the support, the formed film is turned over and again placed on the support. On the thus appearing surface (having been in contact with the support), another polymer solution is cast from another outlet to form a film.

The used polymer solutions may be the same or different from each other. The function of each formed polymer layer can be given by each corresponding solution extruded from each outlet.

Other functional layers (e.g., adhesive layer, dye layer, antistatic layer, anti-halation layer, UV absorbing layer, polarizing layer) can be simultaneously formed together with the polymer layer in the above manner.

In a conventional single layer preparation process, it is necessary to extrude a polymer solution having such high concentration and such high viscosity that the resultant film may have the aimed thickness. Accordingly, that polymer solution is often so unstable that solid contents are deposited to cause troubles and to impair the planeness. To avoid the problem, plural concentrated polymer solutions are simultaneously extruded from outlets onto the support. The thus-prepared thick film has excellent planeness. In addition, since the concentrated solutions are used, the film is so easily dried that the productivity (particularly, production speed) can be improved.

A plasticizer can be added into the polymer solution to enhance mechanical strength of the resultant film or to shorten the time for drying. The plasticizer is, for example, a phosphate ester or a carbonate ester. Examples of the phosphate ester used as the plasticizer include triphenyl phosphate (TPP) and tricresyl phosphate (TCP). Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP.

The content of the plasticizer is preferably in the range of 0.1 to 25 wt. %, more preferably in the range of 1 to 20 wt. %, most preferably in the range of 3 to 15 wt. % based on the amount of the polymer.

Further, a deterioration inhibitor (e.g., oxidation inhibitor, peroxide decomposer, radical inhibitor, metal inactivating agent, oxygen scavenger, amine) may be incorporated in the polymer film. The deterioration inhibitor is described in Japanese-Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If the content is more than 1 wt. %, the inhibitor often oozes out (bleeds out) to appear on the surface of the film. Particularly preferred deterioration inhibitors are butylated hydroxytoluene (BHT) and tribenzylamine (TBA).

In order to make the film easily treatable during the production process, a matting layer containing a matting agent and a polymer may be provided. As the matting agent and the polymer, materials described in Japanese Patent Provisional Publication No. 10(1998)-44327 are preferably used.

The polymer film has a thickness preferably in the range of 10 to 200 μm, more preferably in the range of 20 to 150 μm, most preferably in the range of 30 to 140 μm.

The birefringence of the film measured at the wavelength of 550 nm is preferably in the range of 0.00196 to 0.01375, more preferably in the range of 0.00168 to 0.006875, most preferably in the range of 0.00275 to 0.00458.

(Stretching of Film)

The retardation of the polymer film can be controlled by stretching.

The stretching ratio (the ratio of length increased by stretching based on the original length) is preferably in the range of 3 to 100%, more preferably in the range of 5 to 80%, most preferably in the range of 10 to 60%. The film may be stretched either uniaxially or biaxially.

In the biaxial stretching, the film is simultaneously or successively (step-by-step) stretched in two directions (namely, simultaneous biaxial stretching or successive biaxial stretching). The successive biaxial stretching is preferred in consideration of continuous production. The process of the successive biaxial stretching comprises the steps of casting the dope onto a band or a drum, peeling the formed film, stretching the film laterally (perpendicularly to the casting direction), and then stretching the film longitudinally. The longitudinal stretching step may be performed prior to the lateral stretching.

Japanese Patent Provisional Publication Nos. 62(1987)-115035, 4(1992)-152125, 4(1992)-284211, 4(1992)-298310 and 11(1999)-48271 describe the lateral stretching, which is performed at room temperature or an elevated temperature. The elevated temperature is preferably below the glass transition point of the film. The film can be stretched while being dried in the film production. If the film is stretched while the solvent still remains in the film, a special effect is sometimes obtained. The longitudinal stretching can be performed, for example, by controlling the conveying rollers so that the speed of winding up the film may be faster than that of peeling the film. The lateral stretching, on the other hand, can be performed by gradually widening the width between tenters clipping both sides of the conveyed film. Otherwise, after the film is dried, it can be stretched by means of a stretching machine (preferably, the film is uniaxially stretched by means of a long stretching machine).

The steps from casting to drying may be performed under inert atmosphere (e.g., nitrogen gas atmosphere). For winding up the film, generally used machines can be used. Examples of the winding method include a constant tension method, a constant torque method, a taper tension method and a programmed tension control method by which inner stress is kept constant.

(Surface Treatment of Polymer Film)

The polymer film is preferably subjected to surface treatment. Examples of the surface treatment include corona discharge treatment, glow discharge treatment, flame treatment, acid treatment, alkali treatment, and ultraviolet (UV) treatment. Further, in place of or in addition to the surface treatment, an undercoating layer (described in Japanese Patent Provisional Publication No. 7(1995)-333433) may be provided.

For ensuring the planeness of the film, the above treatments are carried out preferably at a temperature not higher than Tg (glass transition temperature) of the film. That is not higher than 150° C.

In the case where the film is used as a protective film of the polarizing plate, the acid or alkali treatment is preferably carried out in consideration of adhesion between the film and the plate. If the film is made of cellulose ester, the surface of the film is saponified by the acid or alkali treatment.

It is particularly preferred to subject the polymer film to the alkali treatment for saponifying.

As the alkali treatment, the steps of immersing the film surface in an alkaline solution, neutralizing with an acidic solution, washing with water, and drying are preferably circularly carried out.

Examples of the alkaline solution include aqueous solutions of KOH and NaOH. The normality of hydroxyl ion is preferably in the range of 0.1 to 3.0 N,.more preferably in the range of 0.5 to 2.0 N. The temperature of the solution is preferably in the range of room temperature to 90° C., more preferably in the range of 40 to 70° C.

In the saponification process, the-alkaline solution may be applied on the film surface in place of immersing. As the solvent for the coating solution, organic solvent or a mixture of organic solvent and water is preferred. Examples of the organic solvent include alcohols (e.g., methanol, ethanol, butanol, isopropyl alcohol), ketones (e.g., acetone, methyl ethyl ketone) and polyhydric alcohols (e.g., propylene glycol, ethylene glycol). Two or more organic solvents may be mixed to used in combination.

The surface energy of the film subjected to the surface treatment is preferably not less than 55 mN/m, more preferably in the range of 60 to 75 mN/m.

The surface energy can be measured by the contact angle method, the wet heating method or the adsorption method (these methods are described in 'The basic theory and application of wetting (written in Japanese)', published by Realize Co., Ltd, 1989). The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

(Orientation Layer)

The polymer film by itself can be used as an optical compensatory sheet.

Otherwise, the polymer film may be used as a support on which an optically anisotropic layer formed from liquid crystal compound is provided. In that case, an orientation layer for aligning the liquid crystal molecules is preferably provided between the polymer film and the anisotropic layer.

If once the alignment of the liquid crystal molecules is fixed after they are oriented, the orientation layer has already accomplished its work and hence the resultant compensatory sheet does not need to comprise the orientation layer. In fact, the optically anisotropic layer containing the aligned and fixed liquid crystal molecules can be alone transferred (without the orientation layer) onto the polymer film, to prepare an optical compensatory sheet.

An orientation layer has a function for aligning the liquid crystal molecules.

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light.

The orientation layer is preferably formed by rubbing a polymer. As the polymer for orientation layer, two or more polymer materials may be used in combination.

For ensuring durability of the optical compensatory sheet, the polymer for orientation layer is preferably crosslinked at any stage from the step of applying the orientation layer on the polymer film to the step of producing the resultant compensatory sheet.

Preferably, two or more polymers are crosslinked and subjected to the rubbing treatment to form the orientation layer. In that case, at least one polymer is preferably crosslinkable by itself or with a crosslinking agent.

Polymers having functional groups can be reacted with light, heat or pH variation to form a crosslinked structure. Otherwise, linking groups are introduced by a reactive crosslinking agent into the polymers so that the polymers can be crosslinked to form the crosslinked structure.

In a normal process, a coating liquid containing the polymers and, if needed, the crosslinking agent is applied on the polymer film, and then, for example, heated to induce the crosslinking reaction. The coating liquid is preferably heated to such a relatively low temperature at this stage that the orientation layer is fully crosslinked in a subsequent heating treatment for forming the optically anisotropic layer described below.

In consideration of orientation of liquid crystal moleculars in the optically anisotropic layer on the orientation layer, the polymer for orientation layer is preferably fully crosslinked after the molecules are aligned.

Examples of the polymer for orientation layer include polymethyl methacrylate, polyacrylic acid, polymethacrylic acid, polystyrene, polymaleinimide, polyvinyl alcohol, denatured polyvinyl alcohol, poly(N-methylolacrylamide), gelatin, polyvinyl toluene, chlorosulfonated polyethylene, cellulose nitrate, polyvinyl chloride, chlorinated poly-olefin, polyester, polyimide, polyvinyl acetate, carboxymethyl cellulose, polyethylene, polypropylene, and polycarbonate. The orientation layer may be also prepared from a coupling agent (e.g., silan coupling agent).

A copolymer comprising two or more repeating units is also usable. Examples of the copolymers include acrylic acid/methacrylic acid copolymer, styrene/maleinimide copolymer, styrene/vinyltoluene copolymer, vinyl acetate/vinyl chloride copolymer, and ethylene/vinyl acetate copolymer.

Preferred examples are water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are particularly preferred, and polyvinyl alcohol and denatured polyvinyl alcohol are further preferred. A denatured polyvinyl alcohol having hydrophobic group is particularly preferred.

It is most preferred to use two kinds of polyvinyl alcohols or denatured polyvinyl alcohols having different polymerization degrees.

The saponification degree of the polyvinyl alcohol or the denatured polyvinyl alcohol is in the range of 70 to 100%, preferably in the range of 80 to 100%, more preferably in the range of 85 to 95%. The polymerization degree is preferably in the range of 100 to 3,000. Examples of the denatured polyvinyl alcohol include polyvinyl alcohols denatured by copolymerization, by chain transfer and by block polymerization. Examples of the denaturing group in the copolymerization include COONa, —Si(OR)$_3$ in which R is hydrogen or an alkyl group, —N(CH$_3$)$_3$.Cl, —C$_9$H$_{19}$, —COOR, —SO$_3$Na and —C$_{12}$H$_{25}$. Examples of the denaturing group in the chain transfer include COONa, SH and C$_{12}$H$_{25}$. Examples of the denaturing group in the block polymerization include —COOH, —CONH$_2$, —COOR (R is hydrogen or an alkyl group) and —C$_6$H$_5$.

The compound represented by the following formula (V) is particularly preferably used as a denaturing agent of polyvinyl alcohol.

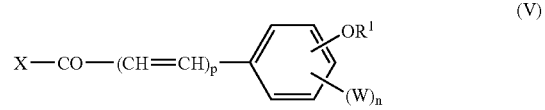

(V)

In the formula (V), R$^1$ is an alkyl group, an acryloylalkyl group, a methacryloylalkyl group, an acryloyloxyalkyl group, a methacryloyloxyalkyl group or an epoxyalkyl group; W is a halogen atom, an alkyl group or an alkoxy group; X is an atomic group required to form an active ester, an acid anhydride or a acid halide; p is 0 or 1; and n is an integer of 0 to 4.

The denatured polyvinyl alcohol is more preferably a product of reaction between polyvinyl alcohol and the compound represented by the following formula (VI):

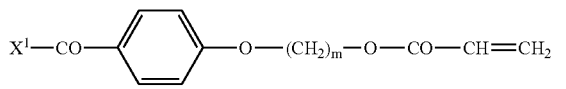

$$X^1-CO-\underset{}{\bigcirc}-O-(CH_2)_m-O-CO-CH=CH_2 \quad (VI)$$

in which $X^1$ is an atomic group required to form an active ester, an acid anhydride or a acid halide; and m is an integer of 2 to 24.

The denaturing agent represented by the above formula (V) may be reacted with not only non-denatured polyvinyl alcohol but also polyvinyl alcohols denatured by copolymerization, by chain transfer or by block polymerization. Preferred examples of the denatured polyvinyl alcohol are described in Japanese Patent Provisional Publication No. 9(1997)-152509.

With respect to the denatured polyvinyl alcohol, Japanese Patent Provisional Publication No. 8(1996)-338913 describes the synthesis, the measurement of visible absorption spectrum and how to determine the amount of introduced denaturing groups.

Examples of the crosslinking agent include aldehydes, (e.g., formaldehyde, glyoxal, glutaraldehyde), N-methylol compounds (e.g., dimethylol urea, methyloldimethyl-hydantoin), dioxane derivatives (e.g., 2,3-dihydroxydioxane), compounds that works when the carboxylic group is activated (e.g., carbenium, 2-naphthalenesulfonate, 1,1-bispyrrolidino-1-chloropyridinium, 1-morpholinocarbonyl-3-(sulfonatoaminomethyl), active vinyl compounds (e.g., 1,3,5-triacryloyl-hexahydro-s-triazine, bis(vinylsulfone)methane, N,N'-methylenebis[β-(vinylsulfonyl)propionamide], active halogen compounds (e.g., 2,4-dichloro-6-hydroxy-s-triazine), isooxazoles and dialdehyde starch. Two or more crosslinking agents may be used in combination.

They are effectively used together with preferably water-soluble polymer, more preferably polyvinyl alcohol or denatured polyvinyl alcohol. Reactive aldehydes are preferred, and glutaraldehyde is particularly preferred in consideration of productivity.

The more the crosslinking agent is added, the more the durability against moisture is improved. However, if the amount of crosslinking agent is too much, the resultant orientation layer poorly aligns the molecules. Accordingly, the amount of crosslinking agent is preferably in the range of 0.1 to 20 wt. %, more preferably in the range of 0.5 to 15 wt. % based on the amount of the polymer.

Even after the crosslinking reaction is completed, the obtained orientation layer contains non-reacted crosslinking agent a little. The amount of the non-reacted crosslinking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, the layer has poor durability. A liquid crystal display comprising such orientation layer often suffers troubles of reticulation if used for a long time or left under hot and humid condition.

The orientation layer can be formed by the steps of coating the polymer film with a coating liquid containing the above polymer and (if needed) the crosslinking agent, heating to dry and crosslink the applied polymer, and subjecting the formed layer to rubbing treatment. The crosslinking reaction may be caused at any step after applying the coating liquid.

In the case where a water-soluble polymer such as polyvinyl alcohol is used, the coating solution is preferably prepared from a mixed solvent of water and an organic solvent having defoaming character (e.g., methanol). The content of methanol in the mixed solvent is preferably 1 wt. % or more, more preferably 9 wt. % or more. Because of defoaming character of the organic solvent, defects on the orientation layer are remarkably decreased, and accordingly the optically anisotropic layer has an improved surface.

As the coating method, known methods such as spin-coating, dip-coating, curtain-coating, extrusion-coating, bar-coating and E type-coating can be adopted. The E type-coating method is particularly preferred.

The thickness of the orientation layer is preferably in the range of 0.1 to 10 μm. The layer of applied coating solution is preferably dried at a temperature of 20 to 110° C. For ensuring sufficient crosslinking, the temperature is more preferably in the range of 60 to 100° C., most preferably in the range of 80 to 100° C. The time for drying is preferably in the range of 1 minute to 36 hours, more preferably in the range of 5 minute to 30 minutes. The pH is also preferably adjusted at an optimal value according to the used crosslinking agent. If glutaraldehyde is used as the crosslinking agent, the pH is preferably in the range of 4.5 to 5.5, more preferably at 5.0.

The rubbing treatment can be conducted in the manner adopted widely for aligning liquid crystal molecules of liquid crystal display. The surface of the layer is rubbed with paper, cloth (gauze, felt, nylon, polyester) or rubber along a certain direction, to give the aligning function. Generally, the layer is rubbed several times with cloth on which fibers having the same length and thickness are provided.

(Optically Anisotropic Layer)

The optically anisotropic layer prepared from a liquid crystal compound is provided on the orientation layer.

The liquid crystal compound composing the optically anisotropic layer may be a rod-like liquid crystal compound or a discotic one. The rod-like or discotic liquid crystal compound may have a low molecular weight or a high molecular weight. Further, even if a low molecular weight liquid crystal compound is crosslinked to become a compound that does not behave as liquid crystal, that compound is also usable.

For preparing the optically anisotropic layer, a solution containing the liquid crystal compound and other optional components (such as polymerization initiator) is applied on the orientation layer.

A solvent for preparing the solution is preferably an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as a wire-bar coating method, an extrusion coating method, a direct gravure coating method, a reverse gravure coating method or a die coating method.

The thickness of the optically anisotropic layer is preferably in the range of 0.1 to 20 μm, more preferably in the range of 0.5 to 15 μm, most preferably in the range of 1 to 10 μm.

Examples of the rod-like liquid crystal compound include azomethines, azoxys, cyanobiphenyls, cyanophenyl esters, benzoic esters, cyclohexanecarboxylate phenyl esters, cyanophenylcyclohexanes, cyano-substituted phenylpyrimidines, alkoxy-substituted phenylpyrimidines, phenyldioxanes, tolanes, and alkenylcyclohexylbenzonitriles.

Metal complexes are also included in the rod-like liquid crystal compounds. Further, a liquid crystal polymer in which the repeating unit comprises a rod-like liquid crystal moiety is also usable as the rod-like liquid crystal compound. In other words, the rod-like liquid crystal compound may be combined with a (liquid crystal) polymer.

Descriptions of the rod-like liquid crystal compounds are found in "Kagaku-Sosetsu, Ekisho no Kageku" (written in Japanese), vol. 22(1994), Chapters 4, 7 and 11; and "Ekisho Devise Handbook" (written in Japanese), chapter 3.

The rod-like liquid crystal compound preferably has a birefringencial index of 0.001 to 0.7.

The molecule of the rod-like liquid crystal compound preferably has a polymerizable group (Q) to fix the alignment.

Examples of the polymerizable group (Q) are shown below.

 (Q1)

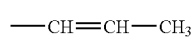 (Q2)

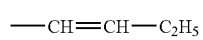 (Q3)

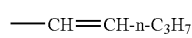 (Q4)

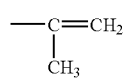 (Q5)

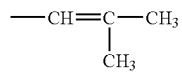 (Q6)

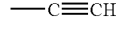 (Q7)

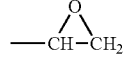 (Q8)

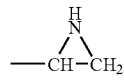 (Q9)

—SH (Q10)

—CHO (Q11)

—OH (Q12)

—CO$_2$H (Q13)

—N=C=O (Q14)

-continued

—NH$_2$ (Q15)

—SO$_3$H (Q16)

—N=C=S (Q17)

The polymerizable group (Q) preferably is an unsaturated polymerizable group (Q1 to Q7) or an epoxy group (Q8), more preferably is an unsaturated polymerizable group; and most preferably is an ethylenically unsaturated group (Q1 to Q6).

However, as the liquid crystal compound used in the invention, a discotic liquid crystal compound is preferred to a rod-like one.

Examples of the discotic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp. 2655, (1994).

The discotic compound has a structure in which the discotic structure unit is located at the center as a parent core and further straight chain groups such as alkyl, alkoxy and substituted benzoyloxy are radially substituted. The discotic compound generally has the properties of liquid crystal. However, it is not necessary for the resultant layer to contain the discotic compound in the above-described form. For example, the low molecular weight discotic liquid crystal compound having a thermo- or photo-reactive group is polymerized by heat or light to form a polymer that does not behave as liquid crystal. Such polymer can be also used in the invention.

Preferred examples of the discotic liquid crystal compound are described in Japanese Patent Provisional Publication No. 8(1996)-50206. Japanese Patent Provisional Publication No. 8(1996)-27284 describes polymerization of the discotic liquid crystal compound.

For fixing the discotic liquid crystal molecules, a polymerizable group should be bound to a discotic core of the molecule to cause the polymerization reaction. However, if the polymerizable group is directly bound to the discotic core, it is difficult to keep the alignment at the polymerization reaction. Therefore, a linking group is introduced between the discotic core and the polymerizable group. Accordingly, the discotic compound having a polymerizable group preferably is a compound represented by the following formula (III).

D(-L-Q)$_n$ (VII)

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

-continued
(D1) 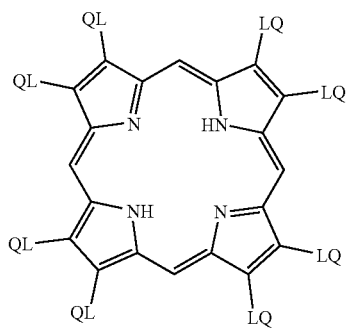
(D2) 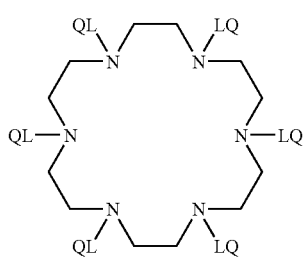
(D3) 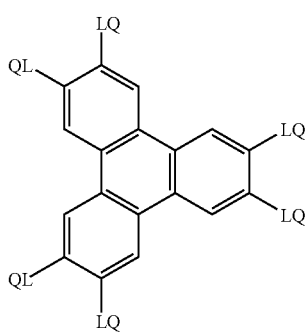
(D4)
(D5) 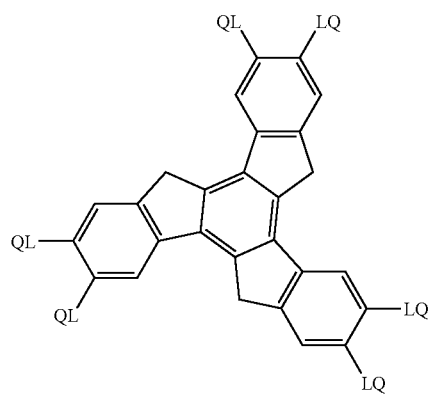
(D6) 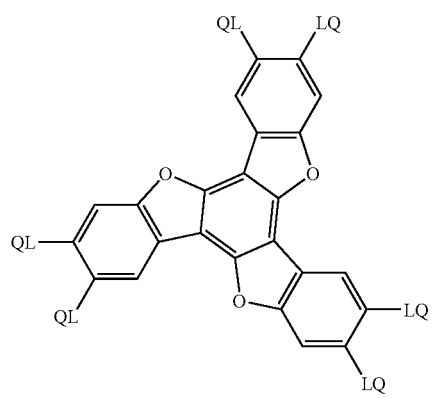
(D7) 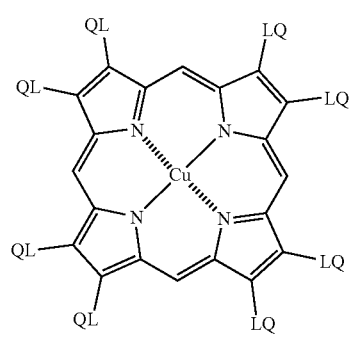
(D8) 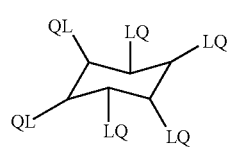

-continued
(D9)
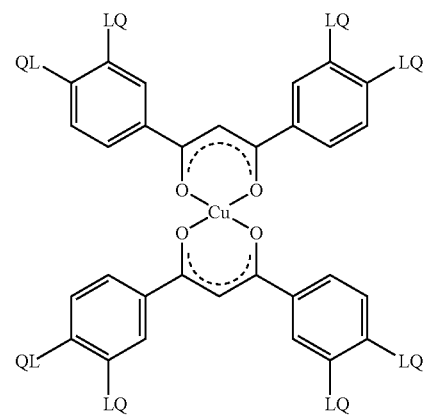
(D10)
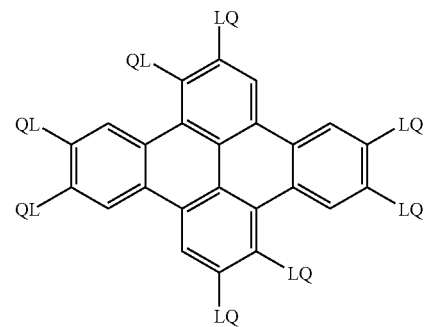
(D11)
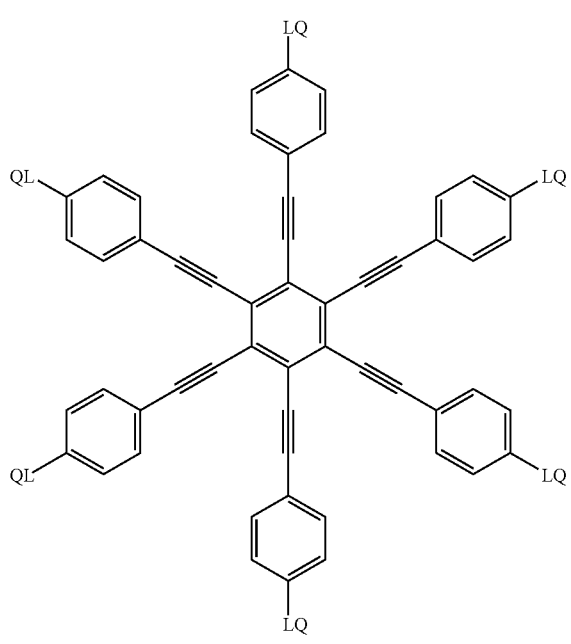
-continued
(D12)
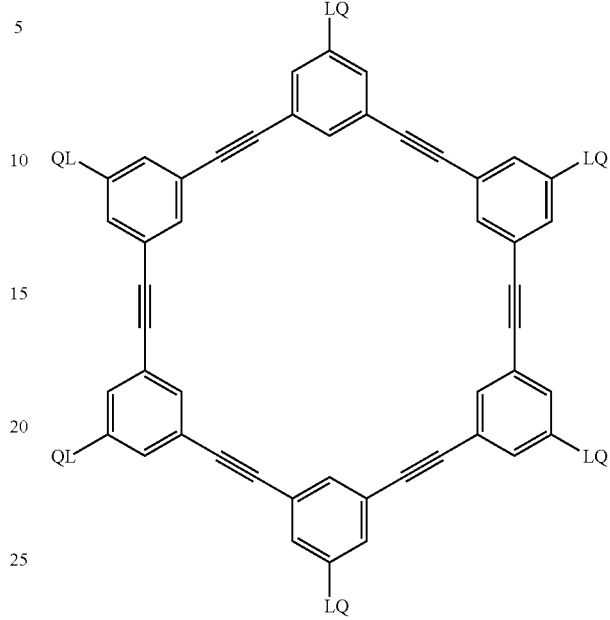
(D13)
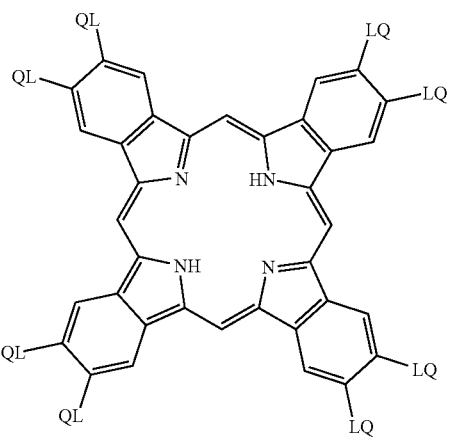
(D14)
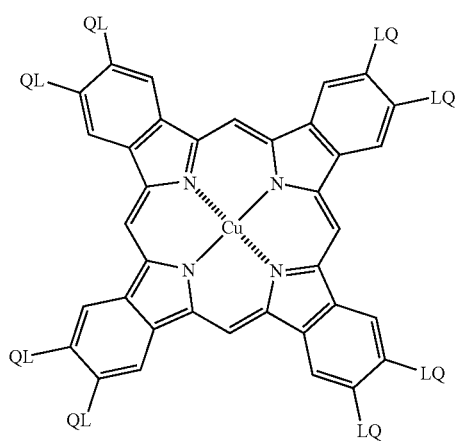

-continued

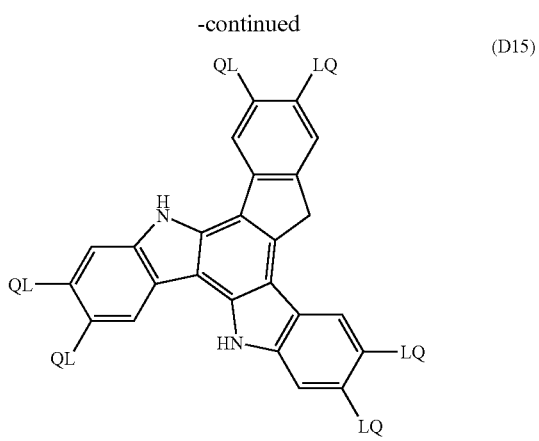

(D15)

In the formula (VII), the divalent linking group (L) is preferably selected from the group consisting of an alkylene group, an alkenylene group, an arylene group, —CO—, —NH—, —O—, —S— and combinations thereof. The L is more preferably a divalent linking group comprising at least two divalent groups selected from the group consisting of an alkylene group, an arylene group, —CO—, —NH—, —O— and —S—. The L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (Q). The AL means an alkylene group or an alkenylene group. The AR means an arylene group. The alkylene group, the alkenylene group and the arylene group may have a substituent group (e.g., an alkyl group).

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AR—O—AL—CO—
L17: —O—CO—AR—O—AL—O—CO—
L18: —O—CO—AR—O—AL—O—AL—O—CO—
L19: —O—CO—AR—O—AL—O—AL—O—AL—O—CO—
L20: —S—AL—
L21: —S—AL—O—
L22: —S—AL—O—CO—
L23: —S—AL—S—AL—
L24: —S—AR—AL—

The definition and examples of the polymerizable groups (Q) in the formula (VII) are the same as those shown above for rod-like liquid crystal compound.

The polymerizable group (Q) preferably is an unsaturated polymerizable group (Q1 to Q7) or an epoxy group (Q8), more preferably is an unsaturated polymerizable group, and most preferably is an ethylenically unsaturated group (Q1 to Q6).

In the formula (VII), n is an integer of 4 to 12, which is determined according to the structure of the discotic core (D). The 4 to 12 combinations of L and Q may be different from each other. However, the combinations are preferably identical.

If the discotic compound is used, the discotic structure unit of each discotic molecule preferably has a plane inclined from the plane of the polymer film at an angle varying in the direction of depth of the layer.

The above-described angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The inclined angle of the discotic unit near the support can be generally controlled by selecting the discotic compound or materials of the orientation layer, or by selecting methods for the rubbing treatment. The inclined angle of the discotic unit near the surface (air) can be generally controlled by selecting the discotic compound or other compounds used together with the discotic compound. Examples of the compounds used together with the discotic compound include plasticizer, surface active agent, polymerizable monomer and polymer. Further, the extent of variation of the inclined angle can be also controlled by the above selection. A polymerizable monomer or polymer is preferably used.

It is particularly preferred to use polymerizable monomers (e.g., compounds having a vinyl, vinyloxy, acryloyl or methacryloyl group) together with the discotic liquid crystal compound. Those monomers are preferably used in the amount of 1 to 50 wt. % (especially 5 to 30 wt. %) based on the amount of the discotic compound. The adhesion between the orientation layer and the optically anisotropic layer can be enhanced with a polymerizable monomer having four or more reactive functional groups.

The polymer is preferably cellulose derivatives. Examples of the cellulose derivatives include cellulose acetate, cellulose acetate propionate, hydrocypropyl cellulose, and cellulose acetate butylate. The amount of the polymer is preferably in the range of 0.1 to 10 wt. %, more preferably in the range of 0.1 to 8 wt. %, most preferably in the range of 0.1 to 5 wt. % based on the amount of the discotic liquid crystal compound.

In the case where the optically anisotropic layer is prepared from the discotic liquid crystal compound, it can be generally prepared by the steps of: coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by the steps of: coating the orientation layer with a solution of the discotic compound and other compounds (e.g., polymerizable monomer, photo-polymerization initiator) dissolved in a solvent, drying, heating to a temperature for forming a discotic nematic phase, polymerizing the heated layer (e.g., by radiation of UV light) and cooling. The transition temperature from discotic nematic phase to solid phase is preferably in the range of 70 to 300° C., especially 70 to 170° C.

The aligned liquid crystal molecules can be fixed with the alignment maintained. The liquid crystal molecules are fixed preferably by a polymerization reaction. The polymerization reaction can be classified into a thermal reaction with a thermal polymerization initiator and a photoreaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with ultraviolet rays.

The exposure energy is preferably in the range of 20 to 50,000 mJ/cm$^2$, more preferably in the range of 20 to 5,000 mJ/cm$^2$, most preferably in the range of 100 to 800 mJ/cm$^2$. The light irradiation can be conducted while the layer is heated to accelerate the photo polymerization reaction.

The protective layer may be provided on the optically anisotropic layer.

(Polarizing Plate)

The polarizing plate comprises two transparent protective films and a polarizing membrane provided between the films. One of the protective films may be the optical compensatory sheet of the invention, and the other may be a normal cellulose acetate film.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

It has been found that the moisture-permeability of the protective film is important for production of the polarizing plate. In producing the polarizing plate, the polarizing membrane and the protective film are laminated with an aqueous adhesive, and then the solvent of the adhesive is diffused into the film to dry. The higher permeability the film has, the more rapidly it is dried. Accordingly, the productivity of the polarizing plate is improved. However, if the permeability is too high, moisture in air is liable to come into the membrane to impair polarizability if the liquid crystal display is used under humid condition.

(Liquid Crystal Display)

The optical compensatory sheet of the invention or a polarizing plate comprising the sheet of the invention laminated on a polarizing membrane is advantageously used in an image-displaying device, particularly in a liquid crystal display, especially in a liquid crystal display of transmission type.

A liquid crystal display of transmission type comprises a pair of polarizing plates and a liquid crystal cell placed between them. The polarizing plate comprises a pair of transparent protective films and a polarizing membrane placed between them. The liquid crystal cell comprises a pair of electrode substrates and liquid crystal provided between them.

The optical compensatory sheet of the invention is placed between the cell and one or each of the polarizing plates.

The liquid crystal cell works preferably according to VA mode, OCB mode, IPS mode or TN mode.

In a liquid crystal cell of VA mode, rod-like liquid crystal molecules are essentially vertically aligned while voltage is not applied.

The liquid crystal cell of VA mode include some types: (1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied; (2) a liquid crystal cell of MVA mode (described in SID97, Digest of tech. Papers, 28(1997), 845), in which the VA mode is modified to be multi-domain type so as to enlarge the viewing angle; (3) a liquid crystal cell of n-ASM mode (described in Abstracts of Japanese Forum of Liquid Crystal (written in Japanese), (1998), pp. 58 to 59), in which rod-like liquid crystal molecules are essentially vertically aligned while voltage is not applied, and the molecules are essentially oriented in twisted multi-domain alignment while voltage is applied; and (4) a cell of SUR-VAIVAL mode (presented in LCD International '98).

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of TN mode, rod-like liquid crystal molecules are essentially horizontally aligned while voltage is not applied, and oriented in a twisted alignment with a twisted angle of 60 to 120°. The liquid crystal cell of TN mode is widely used in color TFT liquid crystal displays, and hence is described in many publications.

When an image-displaying device displays a dark image, the chromaticity or transmittance of image often fluctuates in response to the viewing angle. The optical compensatory sheet of the invention prevents the fluctuation of chromaticity or transmittance.

The fluctuations of chromaticity and transmittance can be evaluated in the following manner. In the below-described examples, they are also evaluated in the following manners.

(Viewing Angle Dependence of Chromaticity)

The chromaticity of image is preferably represented in Luv coordinate, in order to visually express fluctuation. A sensory fluctuation in chromaticity can be evaluated in terms of Cuv value defined by the following formulas:

$$Cuv = (u^{*2} + v^{*2})^{1/2}$$

$$u^* = u - u_0$$

$$v^* = v - v_0$$

The chromaticity fluctuation Cuv is preferably 0.07 or less, more preferably 0.05 or less, further preferably 0.04 or less, and most preferably 0.03 or less. If the Cuv is 0.07 or less, there is practically no problem. If the Cuv is 0.03 or less, the chromaticity fluctuation cannot be recognized with the naked eyes.

(Viewing Angle Dependence of Transmittance)

The fluctuation of transmittance $\Delta T(60)$ is defined by the following formula:

$$\Delta T(60) = \{T(60) - T(0)\}/T(0) \times 100$$

in which $T(60)$: a transmittance observed in the direction in plane at 45° upper from the absorption axis of polarizing plate on the observer side and at 40° inclined from the front when a dark image is displayed, and $T(0)$: a transmittance frontally observed when a dark image is displayed.

The $\Delta T(60)$ is preferably 10% or less, more preferably 5% or less, further preferably 3% or less, and most preferably 2% or less. If the $\Delta T(60)$ is 10% or less, there is practically no problem. If the $\Delta T(60)$ is 2% or less, the fluctuation of transmittance cannot be recognized with the naked eyes.

[Preliminary Experiment]

The absorption spectra of retardation-increasing agents (10-trans, 41-trans and 29-trans) were measured in the ultraviolet-visible wavelength region.

Each agent was dissolved in tetrahydrofuran without stabilizer (BHT), to prepare a $10^{-5}$ mol/dm$^3$ solution. The absorption spectrum of the prepared solution was measured by means of a spectrometer (HITACHI, LTD). The results are set forth in Table 1.

EXAMPLE 1

(Preparation of Polymer Film)

At room temperature, 100 weight parts of cellulose acetate (average acetic acid content: 60.3%), 7.8 weight parts of triphenyl phosphate, 3.9 weight parts of biphenyl-diphenyl phosphate, 1.32 weight parts of the retardation-increasing agent (41-trans), 587.69 weight parts of methylene chloride, and 50.85 weight parts of methanol were mixed to prepare a solution (dope).

The prepared dope was cast on a band, dried at room temperature for 1 minute, and further dried at 45° C. for 5 minutes, so that the amount of remaining solvent was 30 wt. %. After peeled from the band, the formed film was laterally stretched by 25% at 140° C. by means of a tenter. The stretched film was then dried at 135° C. for 20 minutes. The amount of the solvent remaining in the obtained film was 0.1 wt. %.

The thickness of the film was 98 μm. The Re retardation values of the film were measured at the wavelength of 450 nm, 550 nm and 590 nm by means of an ellipsometer (M-150, JEOL COORPORATION), and found 31 nm, 34 nm and 35 nm, respectively. The Rth values were also measured at the wavelength of 450 nm, 550 nm and 590 nm, and found 120 nm, 132 nm and 135 nm, respectively.

The thus-prepared polymer film was used as an optical compensatory sheet.

(Preparation of Polarizing Plate)

Iodine was adsorbed on a stretched polyvinyl alcohol film to prepare a polarizing membrane. On one surface of the membrane, the optical compensatory sheet was laminated with polyvinyl adhesive. The membrane and the sheet were positioned so that the transmission axis of the membrane might be parallel to the slow axis of the sheet.

A commercially available triacetyl cellulose film (Fujitac TD80, Fuji Photo Film Co., Ltd.) was saponified, and laminated on the other surface of the polarizing membrane with polyvinyl adhesive. Thus, a polarizing plate was prepared.

(Preparation of Liquid Crystal Display)

A pair of polarizing plates and a pair of phase-retarders were removed from a commercially available liquid crystal

TABLE 1

$C_5H_{11}$—⌬—O—CO⋯⟨H⟩◀CO—O—⌬—$C_5H_{11}$ (10-trans)

$C_7H_{15}$—⌬—O—CO⋯⟨H⟩◀CO—O—⌬—$C_7H_{15}$ (41-trans)

$C_5H_{11}$—⌬—CO—O⋯⟨H⟩◀O—CO—⌬—$C_5H_{11}$ (29-trans)

| Retardation increasing agent | Maximum wavelength ($\lambda$max) | Absorption coefficient ($\epsilon$) at maximum absorption |
|---|---|---|
| 10-trans | 220 nm | 15,000 |
| 41-trans | 230 nm | 16,000 |
| 29-trans | 240 nm | 20,000 | display (VL-1530S, Fujitsu, Ltd.), which had a liquid crystal cell comprising vertically aligned liquid crystal molecules. In place of the removed members, the prepared polarizing plates were laminated so that the optical compensatory sheets might be on the liquid crystal cell side. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 2.

COMPARISON EXAMPLE 1

The viewing angle of the commercially available liquid crystal display (VL-1530S, Fujitsu, Ltd.), which had a liquid crystal cell comprising vertically aligned liquid crystal molecules, was measured by means of a measuring apparatus (EZ-Contrast 160D, ELDIM) when each of eight tones of black (L1) to white (L8) was displayed. The results are set forth in Table 2.

TABLE 2

| Liquid crystal display | Viewing angle giving contrast ratio of 10 or more without reversing gray scale between L1 and L2 | |
|---|---|---|
| | along transmission axis | at 45° to transmission axis |
| Example 1 | >80° | >80° |
| Comparison Example 1 | >80° | 44° |

EXAMPLE 2

(Preparation of Polymer Film)

At room temperature, 100 weight parts of cellulose acetate (average acetic acid content: 60.9%), 4.6 weight parts of the retardation-increasing agent (10-trans), 7.8 weight parts of triphenyl phosphate, 3.9 weight parts of biphenyldiphenyl phosphate, 594.61 weight parts of methylene chloride and 52.14 weight parts of methanol were mixed to prepare a solution (dope).

The prepared dope was cast on a band, dried at room temperature for 1 minute, and further dried at 45° C. for 5 minutes, so that the amount of remaining solvent was 30 wt. %. After peeled from the band, the formed film was laterally stretched by 28% at 140° C. by means of a tenter. The stretched film was then dried at 135° C. for 20 minutes. The amount of the solvent remaining in the obtained film was 0.1 wt. %. The thickness of the film was 92 μm. The Re retardation values of the film were measured at the wavelength of 450 nm, 550 nm and 590 nm by means of an ellipsometer (M-150, JEOL COORPORATION), and found 39 nm, 42 nm and 43 nm, respectively. The Rth values were also measured at the wavelength of 450 nm, 550.nm and 590 nm, and found 158 nm, 172 nm and 175 nm, respectively.

The thus-prepared polymer film was used as a support of optical compensatory sheet.

(Preparation of Optical Compensatory Sheet)

The polymer film was immersed in a 2.0 N aqueous KOH solution for 2 minutes (25° C.), neutralized with sulfuric acid, washed with pure water, and dried. The surface energy of the thus-saponified film was measured according to the contact angle method, to find 63 mN/m.

On the saponified surface, the following coating solution was then applied in the amount of 28 ml/m² by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was at the angle of 45° to the slow axis (measured at 632.8 nm) of the polymer film, to form an orientation layer.

| Coating solution for orientation layer | |
|---|---|
| The following denatured polyvinyl alcohol | 10 weight parts |
| Water | 371 weight parts |
| Methanol | 119 weight parts |
| Glutaric aldehyde (crosslinking agent) | 0.5 weight part |
| Denatured polyvinyl alcohol | |

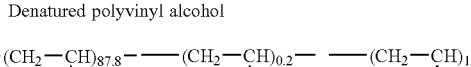

To prepare another coating solution, 41.01 g of the following discotic liquid crystal compound, 4.06 g of ethylene oxide denatured trimethlolpropanetriacrylate (V#360, Osaka Organic Chemicals Co., Ltd.), 0.35 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3. The thus-treated film was fixed on a metal frame, and maintained in a thermostat at 130° C. for 2 minutes to align the molecules of the discotic compound. The film was then irradiated at 130° C. for 1 minute with ultraviolet rays emitted from a high-pressure mercury lamp of 120 W/cm, to polymerize the discotic compound. The film was cooled to room temperature. Thus, an optical compensatory sheet was formed.

Discotic Liquid Crystal Compound

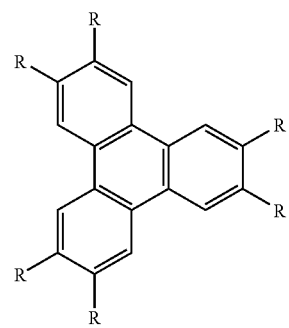

-continued

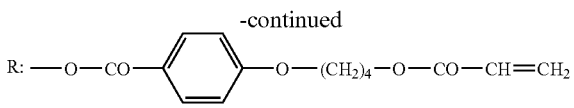

The Re retardation value was measured at 546 nm, and found 38, nm. The average angle (inclined angle) between the disc plane and the polymer film was 40°.

(Preparation of Polarizing Plate)

Iodine was adsorbed on a stretched polyvinyl alcohol film to prepare a polarizing membrane. On one surface of the membrane, the optical compensatory sheet was laminated with polyvinyl adhesive. The membrane and the sheet were positioned so that the transmission axis of the membrane might be parallel to the slow axis of the sheet.

A commercially available triacetyl cellulose film (Fujitac TD80, Fuji Photo Film Co., Ltd.) was saponified, and laminated on the other surface of the polarizing membrane with polyvinyl adhesive. The membrane and the film were positioned so that the transmission axis of the membrane might be perpendicular to the slow axis of the film. Thus, a polarizing plate was prepared.

(Preparation of Liquid Crystal Display)

On a glass plate having an ITO electrode, an orientation film of polyimide was provided and subjected to a rubbing treatment. This procedure was repeated to prepare two substrates, and the substrates were arranged face-to-face so that the rubbing directions might be parallel and that the cell gap might be 6 μm. Between them, a liquid crystal having Δn of 0.1396 (ZLI1132, Merck & Co., Inc.) was introduced to prepare a liquid crystal cell of bend alignment.

Two polarizing plates prepared above were laminated on the liquid crystal cell so that the cell might be between the plates. The plates were arranged so that the optically anisotropic layer in each plate might face to the cell substrate and that the rubbing directions of the cell and the optically anisotropic layer might be anti-parallel.

Voltage of a square wave (55 Hz) was applied to the liquid crystal cell. An image was displayed according to normally white mode (white: 2V, black: 5V). A ratio of the transmittance (white/black) was measured as a contrast ratio by means of a meter (EZ-Contrast 160D, ELDIM) at eight displaying states of L1 (full black) to L8 (full white). From the obtained contrast ratio, the viewing angle of the prepared liquid crystal display was measured. The results are set forth in Table 3.

TABLE 3

| Liquid crystal display | Viewing angle giving contrast ratio of 10 or more without reversing gray scale between L1 and L2 | | |
|---|---|---|---|
| | Upward | Downward | Leftward-rightward |
| Ex. 2 | 80° | 80° | 80° |

EXAMPLE 3

(Preparation of Polymer Film)

At room temperature, 100 weight parts of cellulose acetate (average acetic acid content: 59.5%), 4.00 weight parts of the retardation-increasing agent (41-trans), 7.8 weight parts of triphenyl phosphate, 3.9 weight parts of biphenyldiphenyl phosphate, 594.02 weight parts of methylene chloride and 51.49 weight parts of methanol were mixed to prepare a solution (dope).

The prepared dope was cast on a band, dried at room temperature for 1 minute, and further dried at 45° C. for 5 minutes, so that the amount of remaining solvent was 30 wt. %. After peeled from the band, the formed film was laterally stretched by 35% at 140° C. by means of a tenter. The stretched film was then dried at 135° C. for 20 minutes. The amount of the solvent remaining in the obtained film was 0.1 wt. %.

The thickness of the film was 119.5 μm. The Re retardation values of the film were measured at the wavelength of 450 nm, 550 nm and 590 nm by means of an ellipsometer (M-150, JEOL COORPORATION), and found 42 nm, 46 nm and 47 nm, respectively. The Rth values were also measured at the wavelength of 450 nm, 550 nm and 590 nm, and found 133 nm, 145 nm and 148 nm, respectively.

The thus-prepared polymer film was used as an optical compensatory sheet.

(Preparation of Polarizing Plate)

Iodine was adsorbed on a stretched polyvinyl alcohol film to prepare a polarizing membrane. On one surface of the membrane, the optical compensatory sheet was laminated with polyvinyl adhesive. The membrane and the sheet were positioned so that the transmission axis of the membrane might be parallel to the slow axis of the sheet.

A commercially available triacetyl cellulose film (Fujitac TD80, Fuji Photo Film Co., Ltd.) was saponified, and laminated on the other surface of the polarizing membrane with polyvinyl adhesive. Thus, a polarizing plate was prepared.

(Preparation of Liquid Crystal Display)

A pair of polarizing plates was removed from a commercially available liquid crystal display (6E-A3, Sharp Corporation), which had a liquid crystal cell of TN mode. In place of the removed members, the polarizing plate prepared above was laminated on each side (each of the backlight side and the observer side) of the cell with an adhesive so that the optical compensatory sheet might be on the liquid crystal cell side. The polarizing plates were arranged so that their transmission axes might be in O-mode position.

The viewing angle of the prepared liquid crystal display was measured by means of a measuring apparatus (EZ-Contrast 160D, ELDIM) when each of eight tones of black (L1) to white (L8) was displayed. The results are set forth in Table 4.

COMPARISON EXAMPLE 2

The viewing angle of the commercially available liquid crystal display (6E-A3, Sharp Corporation), which had a liquid crystal cell of TN mode, was measured by means of a measuring apparatus (EZ-Contrast 160D, ELDIM) when each of eight tones of black (L1) to white (L8) was displayed. The results are set forth in Table 4.

TABLE 4

| Liquid crystal display | Viewing angle giving contrast ratio of 10 or more without reversing gray scale between L1 and L2 | | |
|---|---|---|---|
| | Upward | Downward | Leftward-rightward |
| Example 3 | 18° | 23° | 77° |
| Comparison Example 2 | 15° | 25° | 37° |

EXAMPLE 4

(Preparation of Polymer Film)

At room temperature, 20 weight parts of cellulose triacetate (average acetic acid content: 60.3%, viscosity average polymerization degree: 320, water content: 0.4 wt. %, viscosity of 6 wt. % methylene chloride solution: 305 mpa-s, in the form of powder in which the means particle size is 1.5 mm and the standard deviation is 0.5 mm), 58 weight parts of methyl acetate, 5 weight parts of acetone, 5 weight parts of methanol, 5 weight parts of ethanol, 5 weight parts of butanol, 1.2 weight parts of ditrimethylol-propane tracetate (plasticizer), 1.2 weight parts of triphenyl phosphate (plasticizer), 0.2 weight part of 2,4-bis-(n-octylthio)-6-(4-hydroxy-3,5-di-tert-butylanilino)-1,3,5-triazine (UV absorber), 0.2 weight part of 2-(2'-hydroxy-3',5'-di-tert-butylphenyl)-5-chlorbenzotriazole (UV absorber), 0.2 weight part of 2-(2'-hydroxy-3',5'-di-tert-amylphenyl)-5-chlorbenzotriazole (UV absorber), 0.02 weight part of $C_{12}H_{25}OCH_2CH_2O$—$P(=O)$—$(OK)_2$ (releasing agent), 0.02 weight part of citric acid (releasing agent) and 0.05 weight part of silica particles (particle size: 20 nm, Mohs hardness number: approx. 7) were mixed to prepare a solution (dope).

The used cellulose triacetate contained 0.01 wt. % or less of the remaining acetic acid, 0.05 wt. % of Ca, 0.007 wt. % of Mg, and 5 ppm of Fe. The substitution degree at 6-position was 0.95, which was 32.2% based on the total substitution degree at 2-, 3- and 6-positions. The extract with acetone was 11 wt. %. The ratio between weight and number average molecular weights was 0.5, and evenly distributed. The yellowness index, the haze, the transmittance, the glass transition temperature (Tg) and the heat of crystallization were 0.3, 0.08, 93.5%, 160° C. and 6.2 J/g, respectively.

In another mixing tank, 2.25 weight parts of the retardation-increasing agent (41-trans), 16.0 weight parts of methylene chloride and 1.39 weight parts of methanol were placed, heated and stirred, to prepare a retardation-increasing agent solution.

The cellulose acetate solution and the retardation-increasing agent solution were mixed and stirred well to prepare a dope The dope was cast and dried. The amount of solvent remaining in the formed film was 0.5%.

The thickness of the film was 65 μm. The Re retardation values of the film were measured at the wavelength of 450 nm, 550 nm and 590 nm by means of an ellipsometer (M-150, JEOL COORPORATION), and found 7.2 nm, 7.8 nm and 8 nm, respectively. The Rth values were also measured at the wavelength of 450 nm, 550 nm and 590 nm, and found 70 nm, 76 nm and 78 nm, respectively.

The thus-prepared polymer film was used as a support of optical compensatory sheet.

(Preparation of Optical Compensatory Sheet)

The polymer film was immersed in a 2.0 N aqueous KOH solution for 2 minutes (25° C.), neutralized with sulfuric acid, washed with pure water, and dried. The surface energy of the thus-saponified film was measured according to the contact angle method, to find 63 mN/m.

On the saponified surface, the following coating solution was then applied in the amount of 28 ml/m² by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was parallel to the longitudinal direction of the polymer film, to form an orientation layer.

| Coating solution for orientation layer | |
|---|---|
| The denatured polyvinyl alcohol used in Example 2 | 10 weight parts |
| Water | 371 weight parts |
| Methanol | 119 weight parts |
| Glutaric aldehyde (crosslinking agent) | 0.5 weight part |

To prepare another coating solution, 41.01 g of the discotic liquid crystal compound used in Example 2, 4.06 g of ethylene oxide denatured trimethlolpropanetriacrylate (V#360, Osaka Organic Chemicals Co., Ltd.), 0.90 g of cellulose acetate butyrate (CAB-531-0.2, Eastman Chemical), 0.23 g of cellulose acetate butyrate (CAB-531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3.6. The thus-treated film was heated at 130° C. for 2 minutes to align the molecules of the discotic compound. The film was then irradiated at 60° C. for 1 minute with ultraviolet rays emitted from a high-pressure mercury lamp of 120 W/cm, to polymerize the discotic compound. The film was cooled to room temperature, to form an optically anisotropic layer. Thus, an optical compensatory sheet was formed.

The Re retardation value was measured at 546 nm, and found 43 nm. The average angle (inclined angle) between the disc plane and the cellulose acetate film was 42°.

(Preparation of Polarizing Plate)

Iodine was adsorbed on a stretched polyvinyl alcohol film to prepare a polarizing membrane. On one surface of the membrane, the optical compensatory sheet was laminated with polyvinyl adhesive. The membrane and the sheet were positioned so that the transmission axis of the membrane might be parallel to the slow axis of the sheet.

A commercially available triacetyl cellulose film (Fujitac TD80, Fuji Photo Film Co., Ltd.) was saponified, and laminated on the other surface of the polarizing membrane with polyvinyl adhesive. The membrane and the film were positioned so that the transmission axis of the membrane might be perpendicular to the slow axis of the film. Thus, a polarizing plate was prepared.

(Preparation of Liquid Crystal Display)

A pair of polarizing plates was removed from a commercially available liquid crystal display (AQUOS LC-20C1-S, Sharp Corporation), which had a liquid crystal cell of TN mode. In place of the removed members, the polarizing plate prepared above was laminated on each side (each of the backlight side and the observer side) of the cell with an adhesive so that the optical compensatory sheet might be on the liquid crystal cell side. The polarizing plates were arranged so that their transmission axes might be perpendicular to each other.

The viewing angle of the prepared liquid crystal display was measured by means of a measuring apparatus (EZ-Contrast 160D, ELDIM) when each of eight tones of black (L1) to white (L8) was displayed. The results are set forth in Table 5.

COMPARISON EXAMPLE 3

A pair of polarizing plates was removed from a commercially available liquid crystal display (AQUOS LC-20C1-S, Sharp Corporation), which had a liquid crystal cell of TN mode. In place of the removed members, a commercially available polarizing plate was laminated on each side (each of the backlight side and the observer side) of the cell with an adhesive so that the optical compensatory sheet might be on the liquid crystal cell side. The polarizing plates were arranged so that their transmission axes might be perpendicular to each other.

The viewing angle of the prepared liquid crystal display was measured by means of a measuring apparatus (EZ-Contrast 160D, ELDIM) when each of eight tones of black (L1) to white (L8) was displayed. The results are set forth in Table 5.

TABLE 5

| Liquid crystal display | Viewing angle giving contrast ratio of 10 or more without reversing gray scale between L1 and L2 | | |
|---|---|---|---|
| | Upward | Downward | Leftward-rightward |
| Example 4 | 80° | 45° | 160° |
| Comparison Example 3 | 15° | 25° | 37° |

COMPARISON EXAMPLE 4

(Preparation of Polymer Film)

A polycarbonate film (thickness: 60 μm) was 1.23 times stretched at 167° C. by means of a tenter.

The Re retardation values of the film were measured at the wavelength of 450 nm, 550 nm and 590 nm by means of an ellipsometer (M-150, JEOL COORPORATION), and found 128 nm, 120 nm and 114 nm, respectively. The Rth values were also measured at the wavelength of 450 nm, 550 nm and 590 nm, and found 214 nm, 200 nm and 190 nm, respectively.

The thus-prepared polymer film was used as an optical compensatory sheet.

(Preparation of Polarizing Plate)

Iodine was adsorbed on a stretched polyvinyl alcohol film to prepare a polarizing membrane. On one surface of the membrane, the optical compensatory sheet was laminated with polyvinyl adhesive. The membrane and the sheet were positioned so that the transmission axis of the membrane might be parallel to the slow axis of the sheet.

A commercially available triacetyl cellulose film (Fujitac TD80, Fuji Photo Film Co., Ltd.) was saponified, and laminated on the other surface of the polarizing membrane with polyvinyl adhesive. The membrane and the film were positioned so that the transmission axis of the membrane might be perpendicular to the slow axis of the film. Thus, a polarizing plate was prepared.

(Preparation of Liquid Crystal Display)

A pair of polarizing plates was removed from a commercially available liquid crystal display (6E-A3, Sharp Corporation), which had a liquid crystal cell of TN mode. In place of the removed members, the polarizing plate prepared above was laminated on each side (each of the backlight side and the observer side) of the cell with an adhesive so that the optical compensatory sheet might be on the liquid crystal cell side. The polarizing plates were arranged so that their transmission axes might be in O-mode position.

The viewing angle of the prepared liquid crystal display was measured by means of a measuring apparatus (EZ-Contrast 160D, ELDIM) when each of eight tones of black (L1) to white (L8) was displayed. The results were almost the same as those in example 3, but it was noted that the displayed dark image was colored red when obliquely seen.

EXAMPLE 5

(Preparation of Liquid Crystal Display)

On a glass substrate having an ITO transparent electrode, a polymer for forming a vertical orientation layer (LQ-1800, Hitachi-Du Pont Microsystems Co., Ltd.) was applied, dried and subjected to rubbing treatment. This procedure was repeated to obtain two glass substrates with orientation layer.

The prepared two substrates were face-to-face placed so that the orientation layers might face to each other and so that the rubbing direction of the orientation layers might be anti-parallel, and a spacer of 7.6 μm was inserted between the substrates. The substrates were then laminated. To the gap between the substrates, a liquid crystal compound (ZLI-2806, Merck) was injected according to the vacuum injection method, to form a liquid crystal layer. Thus, a cell of bend alignment mode was prepared.

On each surface of the cell, the polarizing plate prepared in Example 3 was laminated. The plates were placed so that the transmission axis of each plate might be at 45° to the rubbing direction of the cell.

Voltage of a square wave 1 kHz was applied, and a ratio of the transmittance (white/black) was measured as a contrast ratio by means of a meter (EZ-Contrast 160D, ELDIM) at eight displaying states of L1 (full black) to L8 (full white). From the obtained contrast ratio, the viewing angle of the prepared liquid crystal display was measured. The results are set forth in Table 6.

TABLE 6

| Liquid crystal display | Viewing angle giving contrast ratio of 10 or more without reversing gray scale between L1 and L2 | | |
|---|---|---|---|
| | Upward | Downward | Leftward-rightward |
| Ex. 5 | 65° | 40° | 100° |

(Fluctuations of Chromaticity and Transmittance in Response to Viewing Angle)

With respect to the liquid crystal displays prepared in Examples 1 to 4 and Comparison Example 1, fluctuations of chromaticity and transmittance in response to the viewing angle were evaluated in the aforementioned manners. The results are set forth in Table 7.

TABLE 7

| Liquid crystal display | Mode | Cuv | ΔT(60) |
|---|---|---|---|
| Example 1 | MVA | 0.045 | 2.7% |
| Example 2 | OCB | 0.033 | 1.8% |
| Example 3 | TN | 0.067 | 8.5% |
| Example 4 | TN | 0.055 | 4.5% |
| Comparison Example 4 | TN | 0.150 | 20.5% |

As shown in Table 7, the invention of each mode satisfyingly reduces the fluctuations of chromaticity and transmittance, as compared with the comparison example.

The invention claimed is:

1. An optical compensatory sheet which consists of a polymer film containing a rod-shaped compound, which gives an ultraviolet absorption spectrum, in which the wavelength of λmax at the maximum absortion peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm.

2. The optical compensatory sheet of claim 1, wherein the polymer film has an Re retardation value of Re450 measured at the wavelength of 450 nm in the range of 10 to 60 nm, and an Re retardation value of Re590 measured at the wavelength of 590 nm in the range of 20 to 70 nm, said values of Re450 and Re590 satisfying the condition of Re590-Re450≧2 nm.

3. The optical compensatory sheet of claim 1, wherein the polymer film is made of cellulose ester.

4. The optical compensatory sheet of claim 1, wherein the polymer film is a film stretched with a stretching ratio of 3 to 100%.

5. The optical compensatory sheet of claim 1, wherein the rod-shaped compound has a linear molecular structure.

6. The optical compensatory sheet of claim 1, wherein the rod-shaped compound is a liquid crystal.

7. The optical compensatory sheet of claim 1, wherein the rod-shaped compound is represented by the formula (III):

$$Ar^1\text{-}L^1\text{-}Ar^2 \qquad (III)$$

in which each of $Ar^1$ and $Ar^2$ independently is an aromatic group; and $L^1$ is a divalent linking group selected from the group consisting of an alkylene group, an alkenylene group, an alkynylene group, a divalent saturated heterocyclic group, —O—, —CO— and a combination thereof.

8. The optical compensatory sheet of claim 7, wherein the rod-shaped compound is represented by the formula (IV):

$$Ar^1\text{-}L^2\text{-}X\text{-}L^3\text{-}Ar^2 \qquad (IV)$$

in which each of $Ar^1$ and $Ar^2$ independently is an aromatic group; each of $L^2$ and $L^3$ independently is a divalent linking group selected from the group consisting of an alkylene group, —O—, —CO— and a combination thereof; and X is 1,4-cyclohexylene, vinylene or ethynylene.

9. An image display device comprising an optical compensatory sheet, wherein the optical compensatory sheet consists of a polymer film containing a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm.

10. A polarizing plate comprising a pair of transparent protective films and a polarizing membrane provided between the transparent protective films, wherein at least one of the protective films is an optical compensatory sheet which consists of a polymer film containing a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm, and wherein the optical compensatory sheet and the polarizing membrane are so placed that the transmission axis of the membrane is parallel or perpendicular to the slow axis of the polymer film.

11. An image display device comprising a polarizing plate, said polarizing plate comprising a pair of transparent protective films and a polarizing membrane provided between the transparent protective films, wherein at least one of the protective films is an optical compensatory sheet which consists of a polymer film containing a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm, and wherein the optical compensatory sheet and the polarizing membrane are so placed that the transmission axis of the membrane is parallel or perpendicular to the slow axis of the polymer film.

12. An optical compensatory sheet which comprises an optically anisotropic layer and a polymer film, said optically anisotropic layer being formed from a liquid crystal compound, and wherein said polymer film contains a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm.

13. The optical compensatory sheet of claim 12, wherein the polymer film has an Re retardation value of Re450 measured at the wavelength of 450 nm in the range of 10 to 60 nm, and an Re retardation value of Re590 measured at the wavelength of 590 nm in the range of 20 to 70 nm, said values of the Re450 and Re590 satisfying the condition of Re590-Re450≧2 nm.

14. The optical compensatory sheet of claim 12, wherein the polymer film is made of cellulose ester.

15. The optical compensatory sheet of claim 12, wherein the polymer film is a film stretched with a stretching ratio of 3 to 100%.

16. The optical compensatory sheet of claim 12, wherein the rod-shaped compound has a linear molecular structure.

17. The optical compensatory sheet of claim 12, wherein the rod-shaped compound is a liquid crystal.

18. The optical compensatory sheet of claim 12, wherein the rod-shaped compound is represented by the formula (III):

$$Ar^1\text{-}L^1\text{-}Ar^2 \quad (III)$$

in which each of $Ar^1$ and $Ar^2$ independently is an aromatic group; and $L^1$ is a divalent linking group selected from the group consisting of an alkylene group, an alkenylene group, an alkynylene group, a divalent saturated heterocyclic group, —O—, —CO— and a combination thereof.

19. The optical compensatory sheet of claim 18, wherein the rod-shaped compound is represented by the formula (IV):

$$Ar^1\text{-}L^2\text{-}X\text{-}L^3\text{-}Ar^2 \quad (IV)$$

in which each of $Ar^1$ and $Ar^2$ independently is an aromatic group; each of $L^2$ and $L^3$ independently is a divalent linking group selected from the group consisting of an alkylene group, —O—, —CO— and a combination thereof and X is 1,4-cyclohexylene, vinylene or ethynylene.

20. An image display device comprising an optical compensatory sheet, wherein the optical compensatory sheet comprises an optically anisotropic layer and a polymer film, said optically anisotropic layer being formed from a liquid crystal compound, and wherein said polymer film contains a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm.

21. A polarizing plate comprising a pair of transparent protective films and a polarizing membrane provided between the transparent protective films, wherein at least one of the protective films is an optical compensatory sheet which comprises an optically anisotropic layer and a polymer film, said optically anisotropic layer being formed from a liquid crystal compound, and wherein said polymer film contains a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm, and wherein the optical compensatory sheet and the polarizing membrane are so placed that the transmission axis of the membrane is parallel or perpendicular to the slow axis of the polymer film.

22. An image display device comprising a polarizing plate, said polarizing plate comprising a pair of transparent protective films and a polarizing membrane provided between the transparent protective films, wherein at least one of the protective films is an optical compensatory sheet which comprises an optically anisotropic layer and a polymer film, said optically anisotropic layer being formed from a liquid crystal compound, and wherein said polymer film contains a rod-shaped compound, which gives an ultraviolet absorption spectrum, in which the wavelength of λmax at the maximum absorption peak is shorter than 250 nm, wherein said spectrum of the rod-shaped compound is measured when the rod-shaped compound is in the form of a solution, wherein the polymer film has an Rth retardation value of Rth450 measured at the wavelength of 450 nm in the range of 30 to 160 nm, and an Rth retardation value of Rth590 measured at the wavelength of 590 nm in the range of 50 to 200 nm, said values of the Rth450 and Rth590 satisfying the condition of Rth590-Rth450≧2 nm, and wherein the optical compensatory sheet and the polarizing membrane are so placed that the transmission axis of the membrane is parallel or perpendicular to the slow axis of the polymer film.

* * * * *